(12) United States Patent
Shrivastav et al.

(10) Patent No.: US 11,703,850 B2
(45) Date of Patent: Jul. 18, 2023

(54) PREDICTIVE MAINTENANCE OF EQUIPMENT

(71) Applicant: ACCENTURE GLOBAL SOLUTIONS LIMITED, Dublin (IE)

(72) Inventors: Anirudh Shrivastav, Jabalpur (IN); Vinay Avinash Dorle, Bangalore (IN); Manu Khanna, Jaipur (IN); Santosh Kumar Soni, Bangalore (IN); Theerthala Sarma Siva Rama Sarma, Secunderabad (IN); Vikash Choudhary, Bangalore (IN); Lokesh Dharmane, Pune (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 17/462,797

(22) Filed: Aug. 31, 2021

(65) Prior Publication Data
US 2023/0064656 A1 Mar. 2, 2023

(51) Int. Cl.
| | |
|---|---|
| G05B 23/02 | (2006.01) |
| G05B 19/4065 | (2006.01) |
| G06F 18/214 | (2023.01) |
| G06F 18/23213 | (2023.01) |

(52) U.S. Cl.
CPC ..... G05B 23/0283 (2013.01); G05B 19/4065 (2013.01); G06F 18/214 (2023.01); G06F 18/23213 (2023.01)

(58) Field of Classification Search
CPC ........... G05B 23/0283; G05B 23/0259; G05B 19/4065; G06K 9/6223; G06K 9/6221; G06K 9/6256
See application file for complete search history.

(56) References Cited

U.S. PATENT DOCUMENTS

| | | | | |
|---|---|---|---|---|
| 11,017,321 | B1* | 5/2021 | Mishra | G05B 23/0283 |
| 2009/0033272 | A1* | 2/2009 | Winterhalter | G05B 9/02 318/636 |
| 2014/0336791 | A1* | 11/2014 | Asenjo | G05B 13/026 700/44 |
| 2021/0073639 | A1* | 3/2021 | Jakkam Reddi | G06N 20/20 |
| 2021/0166083 | A1* | 6/2021 | Zhang | G06N 20/20 |
| 2021/0191384 | A1* | 6/2021 | Trenchard | G06K 9/6256 |

* cited by examiner

*Primary Examiner* — Manuel L Barbee
(74) *Attorney, Agent, or Firm* — Mannava & Kang, P.C.

(57) ABSTRACT

A system and method for facilitating predictive maintenance of an equipment is disclosed. The system may include a data capturer, a plurality of edge computing nodes and a cloud computing device. Each edge computing node may include a first processor. The cloud computing device may include a second processor. The first processor may receive the raw input data from the data capturer and may process the raw input data to obtain a representative data. The representative data may include an insight pertaining to a deviation in the at least one variable and a corresponding remedial action to be taken to correct the deviation. The deviation may be related to a deterioration in the condition of the equipment. The respective edge computing node may facilitate a regulation of the deviation by performing an automated actuation based on the corresponding remedial action.

20 Claims, 22 Drawing Sheets

| | RULE1 322 | RULE2 324 | RULE3 326 | RULE4 328 | RULE5 330 | RULE6 332 | MCC 344 |
|---|---|---|---|---|---|---|---|
| RECORD$_1$ | TRUE | FALSE | TRUE | FALSE | TRUE | FALSE | MCC1(*) |
| RECORD$_2$ | TRUE | FALSE | TRUE | FALSE | TRUE | FALSE | MCC2 |
| RECORD$_3$ | TRUE | FALSE | TRUE | FALSE | TRUE | FALSE | MCC3 |
| RECORD$_4$ | TRUE | FALSE | TRUE | FALSE | TRUE | FALSE | MCC4 |
| RECORD$_5$ | TRUE | FALSE | TRUE | FALSE | TRUE | FALSE | MCC5 |
| RECORD$_6$ | TRUE | FALSE | TRUE | FALSE | TRUE | FALSE | MCC6 |
| RECORD$_7$ | TRUE | FALSE | TRUE | FALSE | TRUE | FALSE | MCC7 |
| RECORD$_i$ | TRUE | FALSE | TRUE | FALSE | TRUE | FALSE | MCC8 |

| RECORD 732 | LABEL PROBABILITY 722 | | | | | | | |
|---|---|---|---|---|---|---|---|---|
| RECORD | X1 | X2 | X3 | Y1 | Y2 | Y3 | Z1 | Z2 | Z3 |
| RECORD1 | 0.02 | 0.03 | 0.76 | 0.04 | 0.02 | 0.12 | 0 | 0 | 0 |
| RECORD2 | 0.04 | 0.05 | 0.12 | 0 | 0 | 0.01 | 0.02 | 0.3 | 0.46 |
| RECORD3 | 0.01 | 0.02 | 0.03 | 0.8 | 0.04 | 0.05 | 0.01 | 0.4 | 0 |
| RECORD4 | 0.04 | 0.05 | 0.12 | 0 | 0.02 | 0.3 | 0.46 | 0 | 0 |
| RECORD5 | 0 | 0.02 | 0 | 0.86 | 0 | 0 | 0 | 0 | 0.12 |

726 ↘

| RECORD 732 | LABELS 734 |
|---|---|
| RECORD1 | [X3, X2, Y3, Y2, Y1, X1, Z3, Z2, Z1] |
| RECORD2 | [Z3, Z2, X3, X2, X1, Z1, Y3, Y2, Y1] |
| RECORD3 | [Y1, Y3, Z2, Y2, Y1, X3, Z3, X2, Z1] |
| RECORD4 | [Z3, Z2, X3, X2, X1, Z1, Y3, Y2, Y1] |
| RECORD5 | [Y1, Z3, X2, Y2, Y3, X3, Z2, X1, Z1] |

728 ↘

| RECORD 732 | LABELS 736 |
|---|---|
| RECORD1 | X3 |
| RECORD2 | - |
| RECORD3 | Y1 |
| RECORD4 | - |
| RECORD5 | Y1 |

⇒ SIGNIFICANT PROBABILITY THRESHOLD = 70% 730

| Clusters 742 | Labels 744 |
|---|---|
| C1 | [X1,X3,Y3,Z2,Z1] |
| C2 | [Y2,X3,Y3,Z2,Z1, X2] |
| C3 | [Z3,Z2,Y3,Y2,Z1, X3] |
| C4 | [Y1,X3,Y3,Z2,Z3] |

← 754

| Record 746 | Cluster ID 748 |
|---|---|
| Record1 | C1 |
| Record2 | C2 |
| Record3 | C3 |
| Record4 | C4 |

← 756

| Record 746 | Cluster ID 748 | # Labeled Records 750 | Record Label 752 |
|---|---|---|---|
| Record1 | C1 | [Y2:15, X3:9, Y3:4, Z1:2] | Y2 |
| Record2 | C2 | [Z2:14, X2:7, Y3:4, Z1:2] | Z2 |
| Record3 | C3 | [X1:6, X3:4, Z2:4, Y1:1] | X1 |
| Record4 | C4 | [Y3:10, X1:7, X3:4, X1:1] | Y3 |

PREDICTIVE MAINTENANCE OF EQUIPMENT

BACKGROUND

Industries rely on equipment or heavy machineries for large-scale manufacturing or fabrication processes. These industries mainly involve high precision manufacturing processes, asset intensive equipment, complex effort manufacturing processes, processes involving use of costly raw materials with rare minerals. Each of these industries involving one or more of the above mentioned processes may encompass respective challenges. For example, high precision manufacturing processes may involve challenges due to very low degree of tolerance and risk of quality rejections. In another example, asset intensive equipment may involve high refurbishment costs and hence the challenge may be to avoid any major deterioration to avoid or lessen the associated expenses. In another example, the complex effort manufacturing processes may have high impact on time and efforts in performing re-machining, thus also leading to economic losses. In another example, the processes using costly materials may involve huge losses even upon small amount of wastage thus making it challenging to avoid wastage. Further, the machineries may require regular maintenance for their effective and smooth operation. However, there is a tendency for the machinery to undergo deterioration and hence may lead to the machinery's unexpected downtime. This may cause huge financial losses and interrupted production. For example, for a semiconductor fabrication plant, an unplanned downtime can result in the loss of millions of dollars per hour due to lost production. There is therefore a need for predictive techniques to estimate the deterioration of machinery in advance.

Further, the conventionally known techniques for predictive maintenance of equipment may include a high reliability on cloud computing mode for processing raw input. As the input may be in form of images and sensor data having large size of high resolution and quality images and huge volume of sensor data, it may be risky to depend on computation response from external data centers, such as, for example, cloud computing, due to the high latency involved therein. For example, semiconductor fabrication plant may perform cloud-based predictive maintenance, which may require complex computational processing using high performance servers. This may not only add to high costs but also may require longer time to transmit the raw input, thus causing delay in providing real-time insights. This delay may not only affect the operational efficiency but also may nullify the purpose of predictive maintenance. Further, conventional operations may also lead to increased carbon emissions or carbon footprints, which may be a growing concern due to increased wastages and energy intensive reprocessing, among other factors.

SUMMARY

An embodiment of present disclosure includes a system including a data capturer. The data capturer may capture a raw input data pertaining to at least one variable corresponding to a condition of an equipment. The raw input data may include at least one of a visual data and a sensor data. The system may include a plurality of edge computing nodes. Each edge computing node may be coupled to the data capturer at a location. Each edge computing node may include a first processor. The first processor may receive the raw input data from the data capturer. The first processor may process the raw input data to obtain a representative data. The representative data may include an insight pertaining to a deviation in the at least one variable and a corresponding remedial action to be taken to correct the deviation, the deviation being related to a deterioration in the condition of the equipment. The respective edge computing node may facilitate a regulation of the deviation by performing an automated actuation based on the corresponding remedial action.

Another embodiment of the present disclosure may include a method for predictive maintenance of an equipment. The method may include a step of receiving, by a first processor of an edge computing node, a raw input data from the data capturer. The method may include a step of processing, by the first processor, the raw input data to obtain a representative data. The representative data may include an insight pertaining to a deviation in the at least one variable and a corresponding remedial action to be taken to correct the deviation. The deviation may be related to a deterioration in the condition of the equipment. The method may include a step of recommending, by the first processor, the remedial action in the form of a feedback. The method may include a step of performing, by an actuator coupled with the equipment, an automated actuation based on the feedback.

Yet another embodiment of the present disclosure may include a non-transitory computer readable medium comprising machine executable instructions that may be executable by a processor to receive a raw input data from the data capturer. The processor may process the raw input data to obtain a representative data. The representative data may include an insight pertaining to a deviation in the at least one variable and a corresponding remedial action to be taken to correct the deviation. The deviation may be related to a deterioration in the condition of the equipment. The processor may perform an automated actuation based on the corresponding remedial action. The processor may receive a selective dataset from a representative set of nodes. The selective dataset may include the representative data from the representative set of nodes selected from the plurality of edge computing nodes. The plurality of edge computing nodes may be segmented into multiple groups such that the representative set of nodes are selected from each of the multiple groups. The processor may train, based on the selective dataset, an artificial intelligence (AI) model, through a collaborative learning for automated prediction of failure state patterns pertaining to the condition of the equipment.

BRIEF DESCRIPTION OF DRAWINGS

FIG. 3B illustrates an overview for an exemplary representation for assessment of a deflection to identify the representative set of nodes, according to an example embodiment of the present disclosure.

FIGS. 7B-7D illustrate overview for an exemplary representation for ensemble approach for assignment of labels, according to an example embodiment of the present disclosure.

FIGS. 8A-8D illustrate overview of the dashboard of FIG. 2A, according to an example embodiment of the present disclosure.

DETAILED DESCRIPTION

Figure 1:
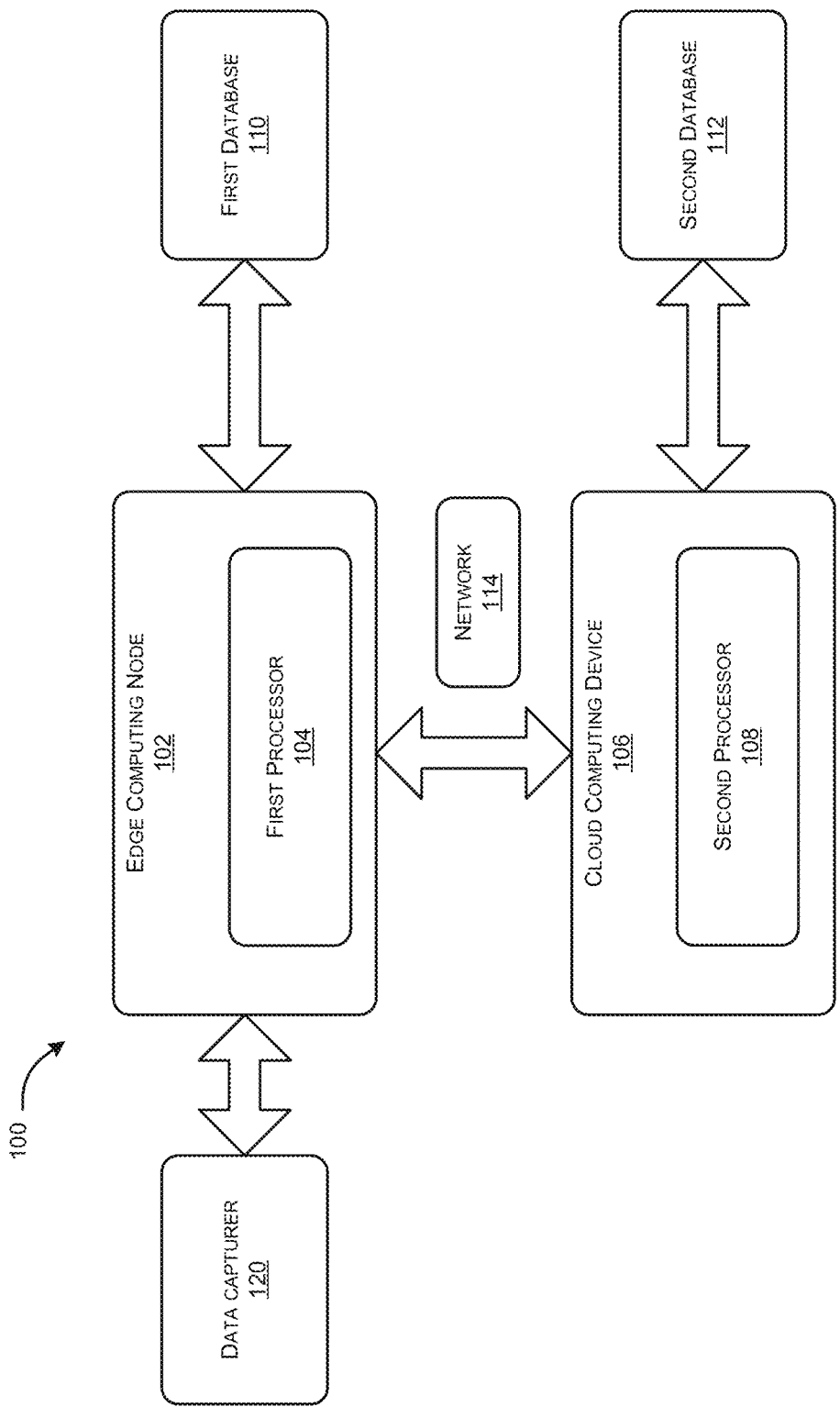
FIG. 1 illustrates an overview of a system for facilitating a predictive maintenance of an equipment, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "a" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

Overview

Various embodiments describe providing a solution in the form of a system and a method for facilitating predictive maintenance of an equipment. The system may include a data capturer at a location. The system may include a plurality of edge computing nodes, wherein each edge computing node may be coupled to the respective data capturer at the location. The data capturer may capture a raw input data pertaining to at least one variable corresponding to a condition of an equipment. The raw input data may include at least one of a visual data and a sensor data. Each edge computing node is coupled to the respective data capturer at a location. In an example embodiment, each edge computing node may include a first processor. The first processor receive the raw input data from the data capturer. The first processor may process the raw input data to obtain a representative data. The representative data may include an insight pertaining to a deviation in the at least one variable and a corresponding remedial action to be taken to correct the deviation. The deviation may be related to a deterioration in the condition of the equipment. In an example embodiment, the respective edge computing node may facilitate a regulation of the deviation by performing an automated actuation based on the corresponding remedial action. In an example embodiment, the system may also a cloud computing device communicably coupled to the plurality of edge computing nodes. The cloud computing device may include an AI model that may be trained by adaptive federated learning based on segmentation.

Exemplary embodiments of the present disclosure have been described in the framework of for facilitating a predictive maintenance of an equipment. This is mainly to achieve decrease in unplanned downtime. The embodiments may describe a system and a method that ay receive raw data from the data capturer to estimate a deviation. The deviation may be related to deterioration in the condition of the equipment. The system may also facilitate regulation of the deviation by performing an automated actuation based on the corresponding remedial action. In an example embodiment, the system may perform the evaluation of the deviation at the local node i.e. the edge computing node at the location. This is to achieve immediate insights/alerts to an estimated deviation. The edge node processing may also considerably reduce the processing costs as well as reduce latency/data transfer requirements at the cloud computing device. Further, in another example embodiment, the AI model at the cloud computing device may be trained by adaptive federated learning based on segmentation. The AI model may be trained by based on selective data or representative data from representative set of nodes from the plurality of edge computing nodes. In an embodiment, the representative data may be sent from a representative set of nodes that are selected based on occurrence of highly deviant instances in the variables. The representative data may pertain to bare minimum data pertaining to variables of the equipment as obtained from the data capturer of the respective edge computing node. This reduces the amount of data transfer otherwise required in conventional techniques. The AI model may also be able to predict deterioration timeline of the equipment and other such parameters based on minimal historical data. The system and method of the present disclosure may be applied to several applications. The application may include use of equipment and/or machineries, in manufacturing/fabrication plants such as, for example, semiconductor industry. The application may also include component assembling plants, and other such industries. However, one of ordinary skill in the art will appreciate that the present disclosure may not be limited to such applications. The system may be integrated with any equipment based industry that would aim at achieving at least one objective. The objective may be at least one of automatic monitoring of equipment condition to meet compliance requirements, reduction in carbon footprint avoiding or reducing downtime, reduction in data latency, facilitating real-time and priority based insights, and other such objectives. The solution proposed by the present disclosure may thus facilitate achieving the one or more mentioned objectives, while providing a strategic tool to improve equipment life and performance. Several other advantages may be realized.

FIG. 1 illustrates a system 100 for facilitating a predictive maintenance of an equipment, according to an example embodiment of the present disclosure. The system 100 may be implemented by way of a single device or a combination of multiple devices that are operatively connected or networked together. The system 100 may be implemented in hardware or a suitable combination of hardware and software. The system 100 includes a plurality of edge computing nodes 102. In an embodiment, the plurality of edge computing nodes 102 may be at different locations. Each edge computing node 102 may include a first processor 104. The system 100 may include a data capturer 120 at a location. The data capturer 120 may capture a raw input data pertaining to an equipment at the location. Each edge computing node 102 may be coupled to the respective data capturer 120 at the location. The system 100 may include a cloud computing device 106. The cloud computing device 106 may be communicably coupled to the plurality of edge computing nodes 102 through a network 114. Each edge computing node 102 may be coupled to a first database 110. The cloud computing device 106 may be coupled to a second database 112.

The system 100 may be a hardware device including the first processor 104 and the second processor 108 for executing machine readable program instructions to facilitate a predictive maintenance of an equipment. Execution of the machine readable program instructions by the first processor 104 and/or the second processor 108 may enable the proposed system to facilitate automated predictive maintenance of the equipment. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 102 may include, for example, microprocessors, microcomputers, microcontrollers, digital signal processors, central processing units, state machines, logic circuits, and/or any devices that manipulate data or signals based on operational instructions. Among other capabilities, processor 102 may fetch and execute computer-readable instructions in a memory operationally coupled with system 100 for performing tasks such as data processing, input/output processing, data extraction, and/or any other functions. Any reference to a task in the present disclosure may refer to an operation being or that may be performed on data.

The data capturer 120 may capture a raw input data pertaining to at least one variable corresponding to a condition of an equipment. The raw input data may include at least one of a visual data and a sensor data. The first processor 104 may process the raw input data to obtain a representative data. The representative data may include an insight pertaining to a deviation in the at least one variable. The representative data may also include a corresponding remedial action to be taken to correct the deviation. The deviation may be related to a deterioration in the condition of the equipment. The respective edge computing node at the location may facilitate a regulation of the deviation by performing an automated actuation based on the corresponding remedial action. The system 100 may thus facilitate immediate remedial action based on local edge processing. In another example embodiment, the cloud computing device 106 may be communicably coupled to the plurality of edge computing nodes 102.

Figure 2A:
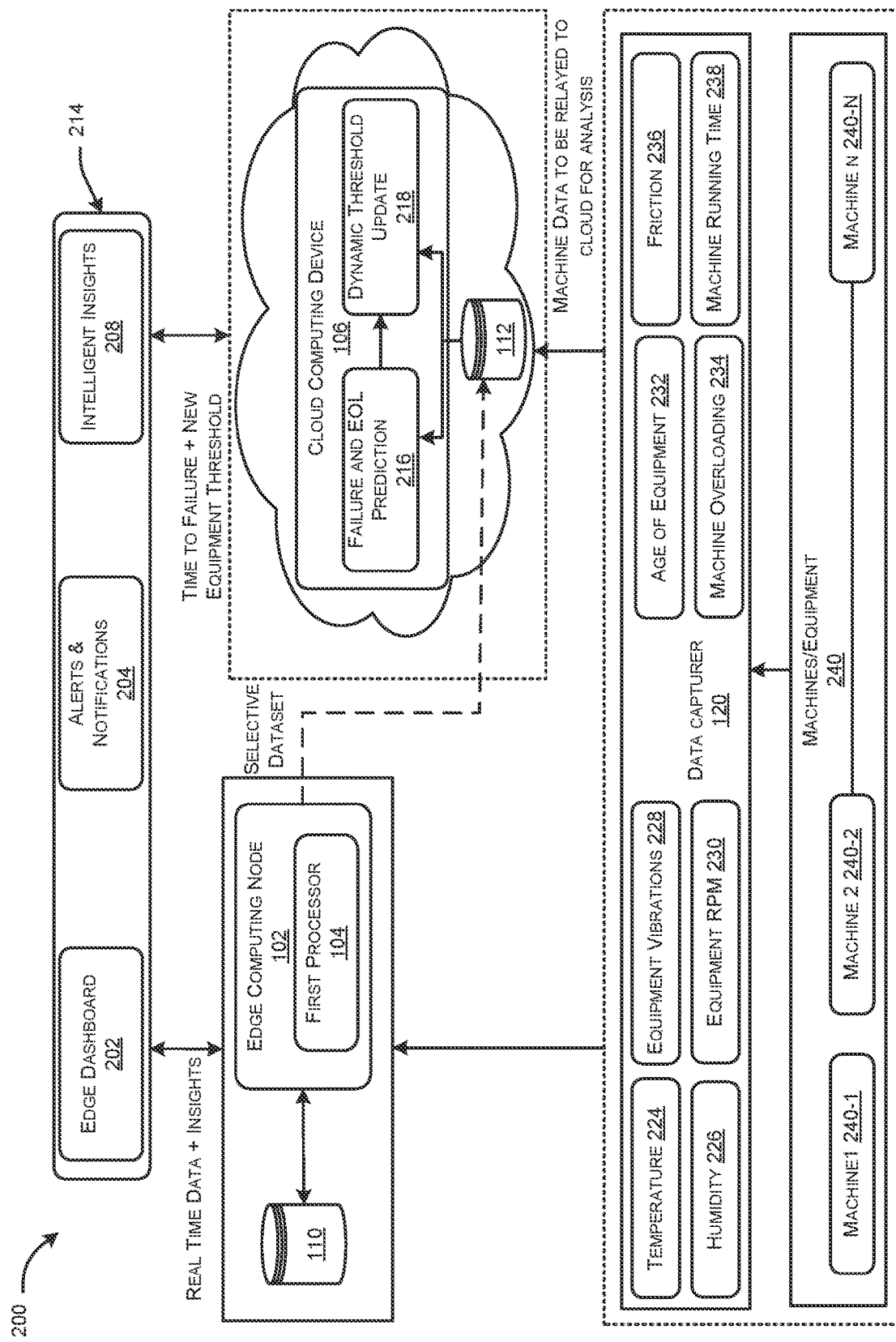
FIG. 2A illustrates an overview for an exemplary implementation including components of the system of FIG. 1, according to an example embodiment of the present disclosure.

FIG. 2A illustrates an overview 200 for an exemplary implementation including components of the system of FIG. 1, according to an example embodiment of the present disclosure. As illustrated in FIG. 2A, an equipment 240 (hereinafter interchangeably referred to as "machine" or "machines" or machinery) may be a single machine or a group of machines. In an example embodiment, the equipment 240 may include group of machines 240-1, 240-2, ... 240-N at the location. Each equipment/machine or group of machines may be associated with the data capturer 120 of FIG. 1. The data capturer 120 may capture the raw input data pertaining to at least one variable corresponding to a condition of the equipment 240. In an embodiment, the data capturer 120 may be at least one of a visual data capturer and an Internet of Things (IoT) device. In an example embodiment, the visual data capturer facilitates to capture the visual data pertaining to the condition of the equipment. In an example embodiment, the visual data capturer may include at least one of a camera, thermal camera and a closed-circuit television (CCTV). Other visual data capturer devices that may facilitate capturing the visual data can also be used. The IoT device may include at least one IoT sensor to detect the sensor data pertaining to the at least one variable condition corresponding to the condition of the equipment. In an embodiment, the raw input data may include at least one of a structured and unstructured data. For example, the structured data may correspond to the sensor data received from the IoT device. In another example, the unstructured data may correspond to the visual data such as, for example, images and/or videos of the equipment or associated components, as received from the IoT device. In an example embodiment, the variable may include at least one of a temperature related to the equipment (224), a mechanical vibration related to the equipment (228), an atmospheric humidity in the vicinity of the equipment (226), rotation per minute (RPM) of a tool related to the equipment (230), electrical parameters, equipment parameters, mechanical parameters, a running time or operational time of the equipment 238, machine overloading of the equipment (234), age of the equipment or a tool related to the equipment (232), friction data 236, health of the equipment and maintenance information of the equipment. Each variable may be associated with same or different components of the equipment. It may also be possible that same type of variable may be associated with different components/material contained in the component of the equipment. For example, the variable such as, temperature may pertain to either temperature of a part/component of the equipment 240, temperature of a material associated with the component and other such aspects. The material may include, for example, oil contained in the component of the equipment 240. Various other variables may also be recorded based on the type of the equipment.

As illustrated in FIG. 1 and FIG. 2A, the edge computing node 102 may process the raw input data to obtain a representative data. The edge computing node 102 may be a local node at the location of the equipment 240. The representative data may include an insight pertaining to a deviation in the at least one variable. The representative data may also include a corresponding remedial action to be taken to correct the deviation. The deviation may be related to a deterioration in the condition of the equipment. The representative data and/or the raw input data may be stored in the first database 110. In an example embodiment, the cloud computing device 106 may be communicably coupled to the plurality of edge computing nodes (102) (only one edge computing node shown in FIG. 1 and FIG. 2A). The cloud computing device 106 may receive a selective dataset from a representative set of nodes. The selective dataset may include the representative data from the representative set of nodes selected from the plurality of edge computing nodes 102. Based on the selective dataset, the AI model of the second processor 108 may be trained based on collaborative learning. This implementation may thus facilitate to send limited data to cloud to minimize time and costs associated with data transfer and/or cloud processing. In an example embodiment, the AI model may be trained through a collaborative learning for automated prediction of failure state patterns pertaining to the condition of the equipment. The trained AI model of the second processor 108 may facilitate prediction of deterioration timeline of the equipment and other parameters. For example, other parameters may include dynamic threshold of the variable. In an example embodiment, the system 100 may facilitate prediction of the failure state patterns to evaluate at least one of a failure timeline of the equipment, an end of life (EOL) prediction and a dynamic threshold limit of the equipment. The term EOL may refer to end of life of an equipment, which may be considered as the last milestone in the life cycle before the equipment is discarded and/or does not provide any further value to a user. In an embodiment, the failure timeline may pertain to an anticipated timeline pertaining to the deterioration in the condition of the equipment. In an exemplary embodiment, the failure timeline may be in the form of mean time to failure (MTTF). MTTF may refer to mean time to failure that is a product performance measure depicting average time elapsed between two consecutive failures and may be an indication of deterioration in the condition of the equipment. In another embodiment, the prediction of EOL may pertain to an anticipated timeline pertaining to the absolute non-functioning condition of the equipment. In another embodiment, the dynamic threshold may be related to a relative change in a predefined threshold pertaining to the at least one variable. For example, if temperature is one of the key variables, then a threshold can be set dynamically for the temperature based on actual operating conditions. This may facilitate to dynamically determine a range of temperature in which the equipment may fail due to temperature breaching the threshold. Based on the detection of the temperature breaching, corrective action may be taken. For example, the corrective action may include addition or introduction of a coolant based on actuation of one or more mechanical actuators associated with the equipment. Various other corrective actions are possible. In an example embodiment, the determination of the dynamic threshold may be performed by analysis of MTTF. In another example embodiment, at least one of EOL, MTTF and dynamic threshold determination may be performed by model training at the cloud computing device 106 whereas the real time predictions may be performed at the respective edge computing node 102.

The system may include an interface to access a dashboard 214 for viewing of insights and/or analyzed data from at least one of the edge computing node 102 and the cloud computing device 106. The interface may include an edge dashboard 202 for viewing real time data (raw input data and/or processed data) and real-time insights. For example, a user or an operator of the equipment 240 may be able to view edge dashboard 202 to view, for example, a video displaying the condition of the equipment 240. The edge dashboard 202 may also be used to view the real-time insights based on the raw input data. The interface may also be able display alerts and/or notifications 204. For example, the alerts and/or notifications 204 may be related to an immediate activity to be performed pertaining to the remedial action. In another example, the alerts and/or notifications 204 may be related to an information about condition of the equipment for which a remedial action may be suggested by the edge computing node 102. The interface may also enable access to insights or prediction performed at the cloud computing device 206. The prediction may be related to the deterioration timeline of the equipment 240 (EOL) and other such parameters, such as, for example, dynamic threshold. The prediction may be done by using the AI model of the second processor 108. In an example embodiment, the cloud computing device may perform prediction of failure and/or end of life (EOL) prediction 216. In another example embodiment, the cloud computing device 106 may perform a dynamic threshold update 218. The dynamic threshold update may be performed to update the AI model with respect with various threshold limits for the variable with time. This may facilitate to accurately predict the deterioration timeline of the equipment based on dynamically changing threshold for the variable. The interface may provide intelligent insights 208 such as for example, expected time for failure of an equipment. The intelligent insights 208 may also be able to predict the expected time for failure (or EOL) and/or the dynamic threshold for a new equipment, which may have limited historical data. In an embodiment, the AI model of the second processor (of cloud computing device 108) may include individual model for prediction of the failure or EOL and for dynamic threshold update. The AI model of the cloud computing device 106 may be trained based on the selective dataset from the edge computing nodes 102 through collaborative learning. The AI model may also be trained using direct machine data from the data capturer 120 that may be relayed to cloud for analysis. The direct machine data may be stored in the second database 112.

Figure 2B:
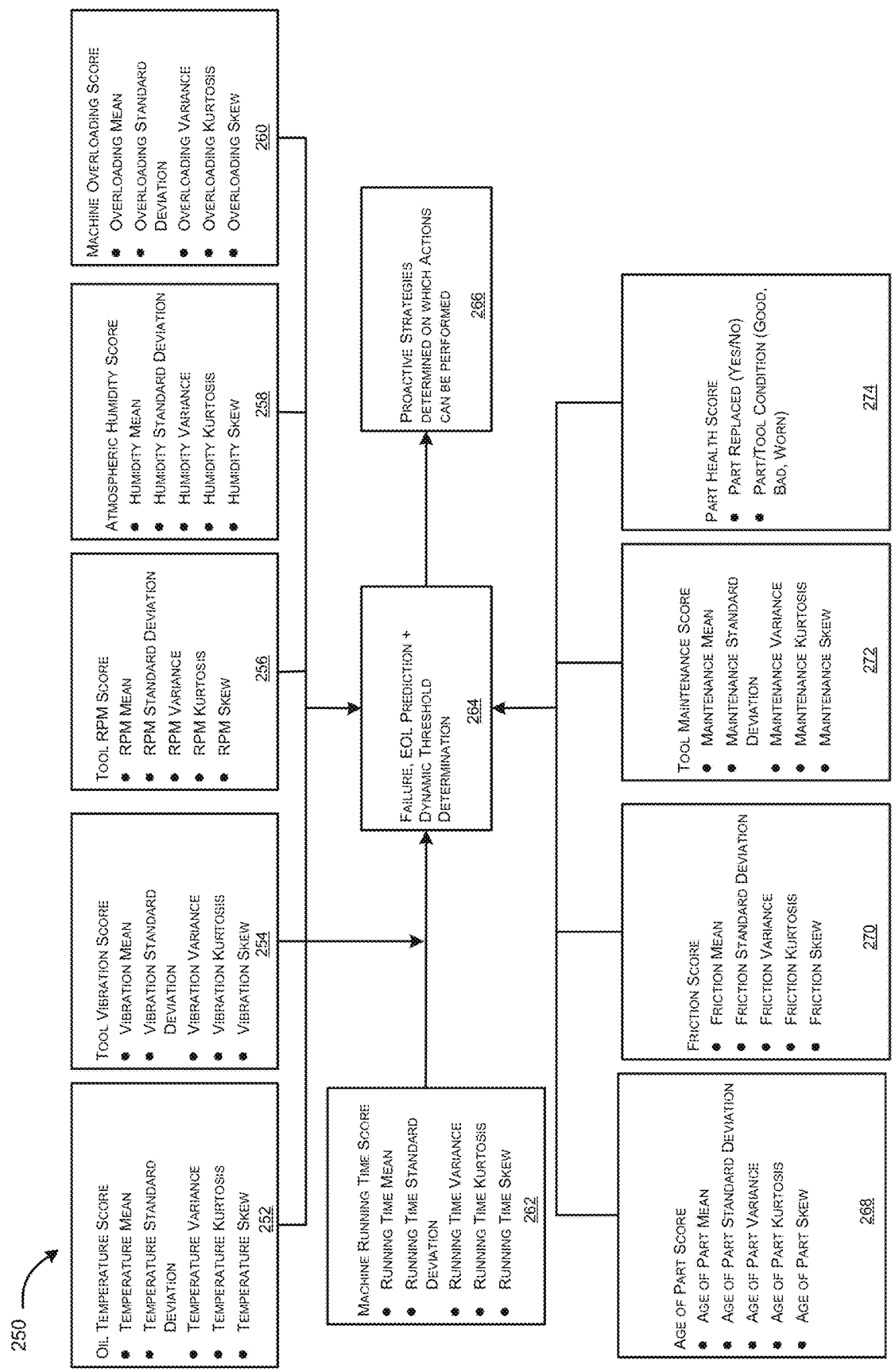
FIG. 2B illustrates an overview of variables and corresponding statistical variables, according to an example embodiment of the present disclosure.

In an example embodiment, the variables may be used to generate statistical variables pertaining to at least one of mean, standard deviation, variance, kurtosis, and skew. FIG. 2B illustrates an overview 250 of the variables and corresponding statistical variables, according to an example embodiment of the present disclosure. For example, if the variable is temperature, the statistical variables of temperature may include mean, standard deviation, variance, kurtosis, and skew pertaining to temperature as shown in 252. In another example, the variable may be vibration of the machine or tool therein. In this example, the statistical variables may include mean, standard deviation, variance, kurtosis, and skew pertaining to vibration score as shown in 254. The same may be applicable to scores for other variables such as atmospheric humidity 258, tool RPM 256, machine overloading score 260, machine running time 262, age of machine 268, friction score 270, maintenance of machine or tool therein 272 and health score of the machine 274. Based on the statistical variables, the system 100 may facilitate prediction of failure, EOL, dynamic threshold (at 264) and other such variables based on local edge processing and collaborative learning based coordination with cloud mode. Based on the prediction, proactive strategies may be recommended to performs one or more corrective measures (266).

Figure 3A:
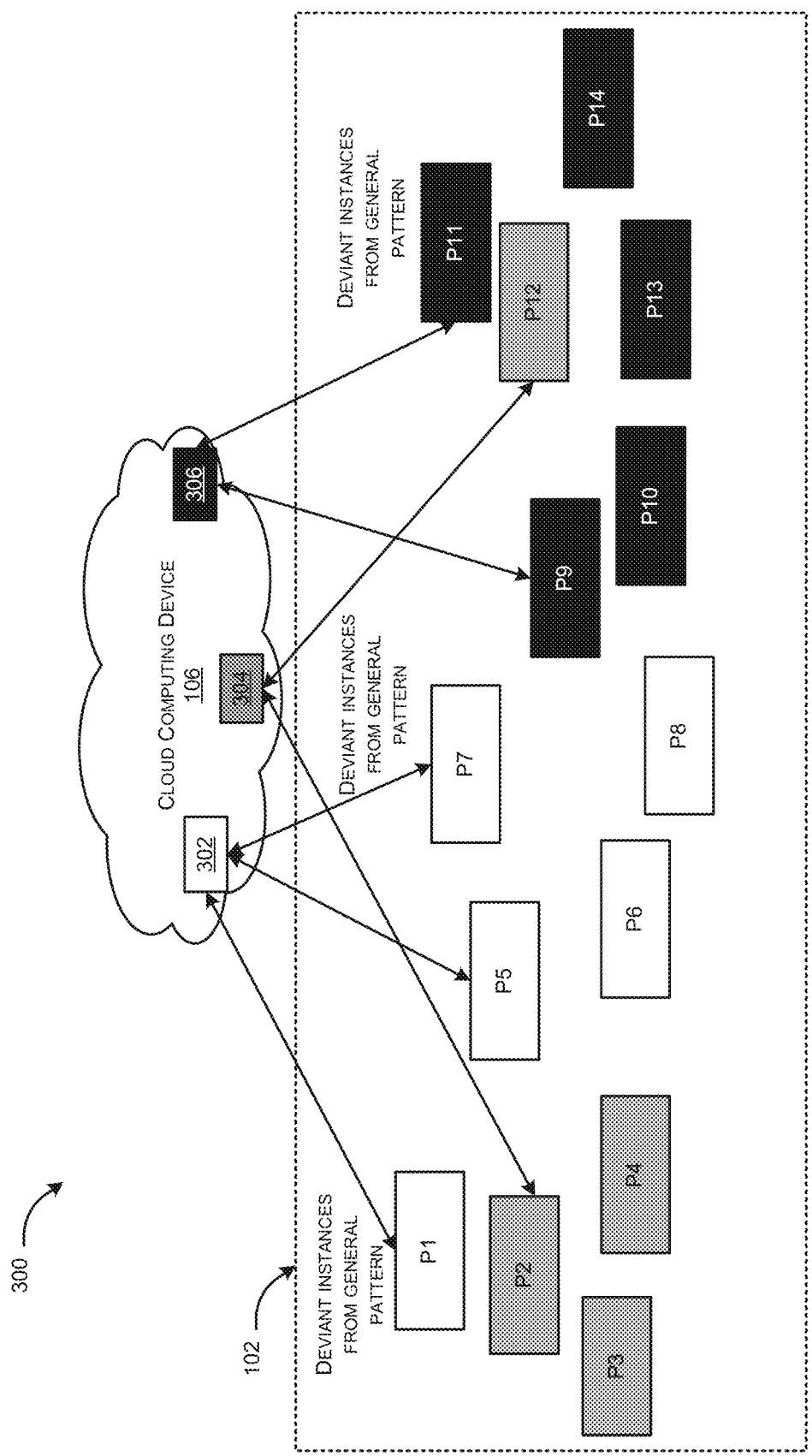
FIG. 3A illustrates an overview for an exemplary implementation of adaptive federated learning based on segmentation, according to an example embodiment of the present disclosure.
Figure 3C:
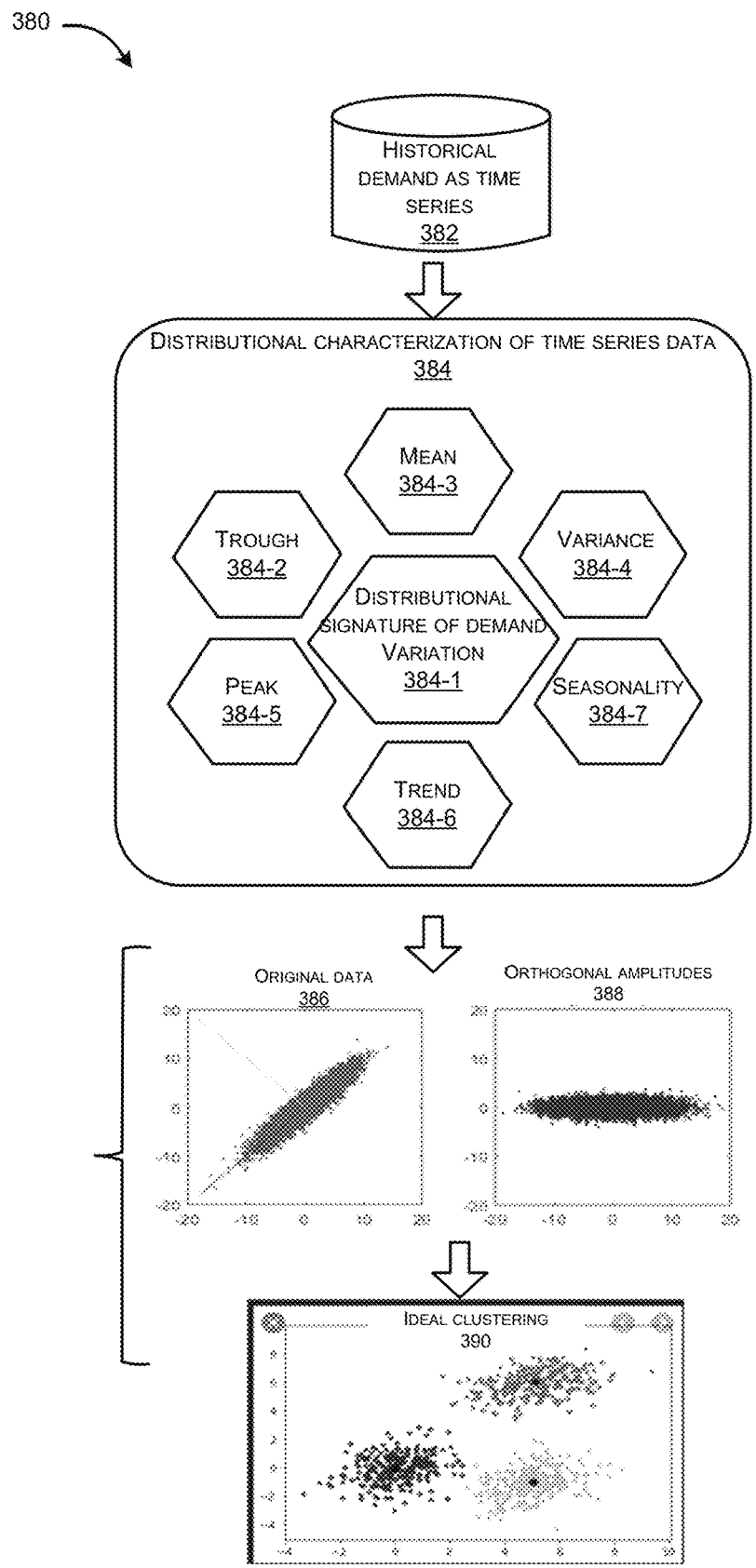
FIG. 3C illustrates an overview 380 for an exemplary representation of node segmentation based on clustering for federated learning based system of FIG. 3A according to an example embodiment of the present disclosure.

In an example embodiment, the AI model may be trained by adaptive federated learning based on segmentation. FIG. 3A illustrates an overview 300 for an exemplary implementation of the federated learning based on segmentation, according to an example embodiment of the present disclosure. As illustrated in FIG. 3A, the cloud computing device 106 may be communicably coupled to the plurality of edge computing nodes 102. The cloud computing device 106 may include the second processor. The system may include the adaptive federated learning based on segmentation. The plurality of edge computing nodes 102 include multiple nodes represented in FIG. 3A as P1-P14. The plurality of edge computing nodes 102 may be segmented into multiple groups such as a first group, a second group and a third group (indicated by white, gray and black boxes respectively). For example, the first group (represented by white boxes) may include edge computing nodes P2, P3, P4 and P12. The second group (represented by gray boxes) may include the edge computing nodes P1, P5, P6, P7 and P8. The third group (represented by black boxes) may include edge computing nodes P9, P10, P11, P13 and P14. The cloud computing device 106 (or the second processor 108) may include implementation of a set of server components, wherein each server component may include individual AI models (shown as 302, 304, 306). In an example, embodiment, each individual AI model (302, 304, 306) may be associated with at least one of the multiple groups. For example, the first group may be associated with the AI model 302, the second group may be associated with AI model 304, the third group may be associated with AI model 306. In an example embodiment, the segmentation of the plurality of edge computing nodes 102 into the multiple groups may be done based on a difference in value ranges of the at least one variable to identify highly deviant instances. In an embodiment, the segmentation of the plurality of edge computing nodes 102 may be done by clustering algorithms using statistically derived parameters on the state of the equipment. The statistically derived parameters may pertain to variables, such as for example, pressure, temperature, RPM and other such parameters. In an example embodiment, the clustering algorithms may pertain to k-means clustering technique (as described in FIG. 3C later).

The federated learning may involve receipt of a selective dataset by the cloud computing device 106. The selective dataset may be obtained from a representative set of nodes selected from each of the multiple groups. The selective dataset may include the representative data from the representative set of nodes selected from each of the multiple groups (of plurality of edge computing nodes 102). For example, the AI model 302 may receive respective representative data from the nodes P1, P5 and P7 of the first group. In another example, the AI model 304 may receive respective representative data from the nodes P2 and P12 of the second group. In another example, the AI model 306 may receive respective representative data from the nodes P9 and P11 of the third group. The AI model (302, 304 and 306) may be trained based on the selective dataset through a collaborative learning. The AI model may be trained for automated prediction of failure state patterns pertaining to the condition of the equipment. This may avoid the need to send huge volumes of data to the cloud computing device, thus not only reducing associated time and costs, but also facilitating privacy of information at local edge nodes. In an example embodiment, the selective dataset/representative data may pertain to data obtained from representative set of nodes that exhibit highly deviant instances with respect to variables of the respective equipment in comparison to a general trend in the variables observed based on historical data. Thus, it may be appreciated that a conventional federated learning would use a typical neural network (ANN) model to encapsulate all the node weights along the hidden layers between the input and output layers. However, in the present invention, the representative data pertaining to only a few selective edge computing nodes 102 (representative set of nodes) are transmitted to the cloud computing device 106. Thus, the deviations or highly deviant instances pertaining to individual edge computing nodes 102 are processed at centralized server to sieve out global deviations. This facilitates to reduce the communication costs otherwise involved in conventional federated learning based systems. Further, this also allows to maintain privacy of data pertaining to the individual edge computing nodes 102 as the representative data may not involve any direct information or details about the respective edge computing node 102 from where the representative data may be obtained. In an example embodiment, the representative data may be continuously propagated between respective client (edge computing node 102) and server (cloud computing device 106).

In an example embodiment, the representative set of nodes may be identified by assessing a deflection in expected values of the at least one variable beyond a predefined threshold. FIG. 3B illustrates an overview 350 for an exemplary representation for assessment of a deflection to identify the representative set of nodes, according to an example embodiment of the present disclosure. As shown in FIG. 3B, the deflection may be identified by evaluation of an outlier data. The outlier data may be obtained by assessing a set of records (record 1, record 2, ... record i) against a predefined set of rules (rule 1, rule 2, ... rule 6) illustrated as columns 322, 324, 326, 328, 330 and 332 respectively. In this context, each record may indicate a discrete state pertaining to the at least one variable. The assessment of the set of records may be performed to obtain a conformance score (MCC or MCCi) illustrated as column 344. In an embodiment, the predefined set of rules may pertain to prevalent rules in the dataset and may be associated with at least one of support, confidence and lift that may be associated with state of a variable "X" corresponding to a state of a variable "Y". The support, confidence and lift may be represented by the below equations:

$$\text{Support} = \frac{frq(X, Y)}{N}; \text{Confidence} = \frac{frq(X, Y)}{frq(X)};$$

$$\text{Lift} = \frac{\text{Support}}{\text{Support }(X) \times \text{Support }(Y)}$$

In an embodiment, the MCC value may be obtained by evaluating conformance of the records to the predefined set of rules. In an example embodiment, the record may pertain to state of one or more variables, for example, pressure (high), temp (low), humidity (low) and other variables. Based on which records show conformance to the predefined set of rules, the MCC score may be evaluated. For example, the MCC score can be calculated by adding the support value for all the records that show conformance to rules upon comparison. In an embodiment, a record with minimal MCCi score may be considered as the anomaly. This means that the nodes with minimal value of the conformance score or MCCi value may be selected as the representative set of nodes. This also means that the representative set of nodes display the greatest deflection from the expected values and mainly represent outlier data. The MCCi values may pertain to the conformance count/score of record$_i$, as identified based on the predefined set of rules. To obtain the MCCi values, a consolidated total of all records conformance to all predefined set of rules may be calculated. MCCi score is calculated as $$nd(t) = \frac{\sum_{XCt \cap X \varepsilon F} sup(X)}{|F|}$$

wherein nd(t) may be a normal degree of a transaction t; F may be complete set of frequent dataset mined from input data with a given threshold; and
sup(X) may represent support value of a frequent dataset (X ε F).

In an embodiment, if nd(t) is low, the corresponding transaction may be likely to be less normal. Based on this assumption, the system may generate output including top-k transactions in the normal degree of ascending order as outliers. The segmentation of nodes may include clustering of the edge computing nodes 102 based on historical data and clustering algorithms. FIG. 3O illustrates an overview 380 for an exemplary representation of node segmentation based on clustering for federated learning based system of FIG. 3A, according to an example embodiment of the present disclosure. As shown in FIG. 3O and the explanation provided hereinabove for FIG. 3A, based on historical data (382) and several variables available therein, distributional characterization of time series data (384) may be evaluated such as for example, at least one of distributional signature of demand variation (384-1), trough (384-2), mean (384-3), variance (384-4), peak (384-5), trend (384-6) and seasonality (384-7). Based on further processing of original data 386, processed data based on reduced dimensionality may be obtained (shown as orthogonal amplitude 388). Based on the processed data with reduced dimensionality, clustering may be performed to group the various edge computing nodes 102 (referred earlier as "segmented into multiple groups") based on similar operational characteristics of the respective equipment at the edge computing nodes 102. The outcome is in the form of the multiple groups (shown as multiple clusters in box 390) that indicate segmentation for federated learning of FIG. 3A. Based on the segmentation, respective server component or respective AI model (shown as 304, 306, 308 in FIG. 3A) may be associated in federated learning. In an exemplary embodiment, the clustering may be performed by k-means clustering technique. In an embodiment, the segmentation also allows to select clients (edge computing nodes) smartly with good cluster representation.

Figure 4:
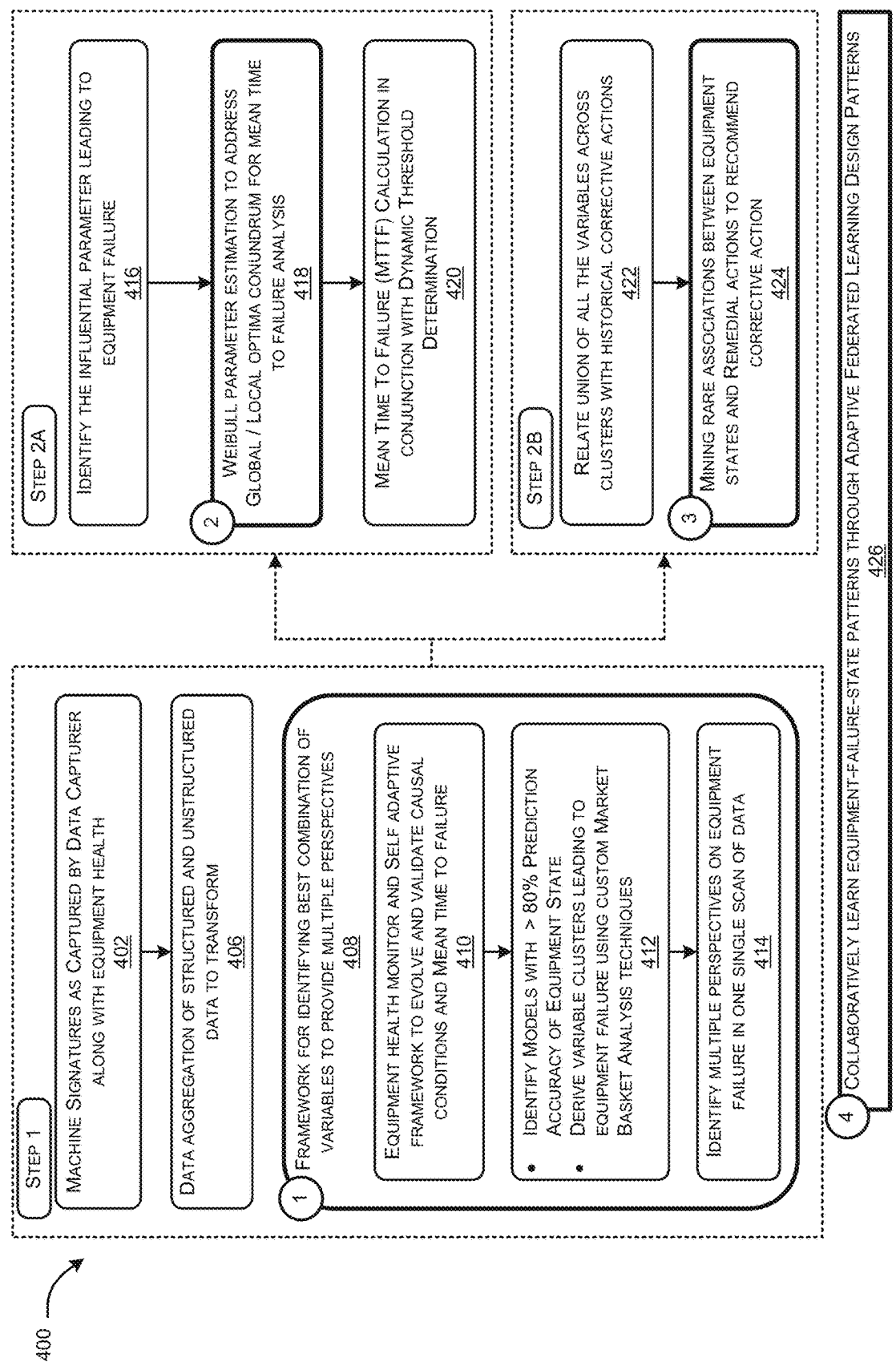
FIG. 4 illustrates an overview for an exemplary representation of various key steps involved in the predictive maintenance of an equipment, according to an example embodiment of the present disclosure.

FIG. 4 illustrates an overview 400 for an exemplary representation of various key steps involved in the predictive maintenance of an equipment, according to an example embodiment of the present disclosure. As illustrated, the overview 400 includes step 1, step 2A and step 2B, wherein at 402, machine signatures may be captured by data capturer 120. The machine signatures may mainly include raw input data captured by the data capturer 120 (of FIG. 1). At 406, the raw input data is send to the edge computing node 102. the raw input data may include structured and unstructured data that may be aggregated for processing by the first processor 104. in an example embodiment, the edge computing node 102 may identify a framework (408) for evaluating best combination of variables to provide multiple perspectives. The multiple perspectives may include discrete perspectives corresponding to the insight pertaining to a deviation. The discrete perspectives are in the form of variable clusters. The edge computing device may facilitate equipment health monitor and self adaptive framework to evolve and validate causal conditions and mean time to failure (MTTF) (at 410). To derive the discrete perspectives, the first processor 104 may identify selected variables from the at least one variable. The selected variables may be used to generate statistical variables pertaining to at least one of mean, standard deviation, variance, kurtosis, and skew. Based on the statistical variables, the first processor 104 may perform an analysis 412 pertaining to co-occurrence of the statistical variables. This may be done to identify at least one endorsed group including a combination of the statistical variables that co-occur with each other in a historical data processed by at least one trained model having a prediction accuracy above 80%. The endorsed group may be assessed to evaluate for consistency of occurrence of the statistical variables across the endorsed groups to obtain the discrete perspectives (414). The overall collective steps (1, 2A and 2B) of FIG. 4 are further elaborated in detail in FIG. 5. Further, based on one or more insights from the edge computing node (as explained in FIG. 2A), the system 100 may facilitate collaboratively learning of equipment-failure-state patterns through adaptive federated learning design patterns (at 426). In an example embodiment, the steps indicated by (1) (i.e. obtaining variable clusters/perspectives) may be performed by respective edge computing node 102 and the steps indicated as (2) and (3) (i.e. Weibull parameter estimation and mining rare association) may be performed at the cloud computing device 106.

Figure 5:
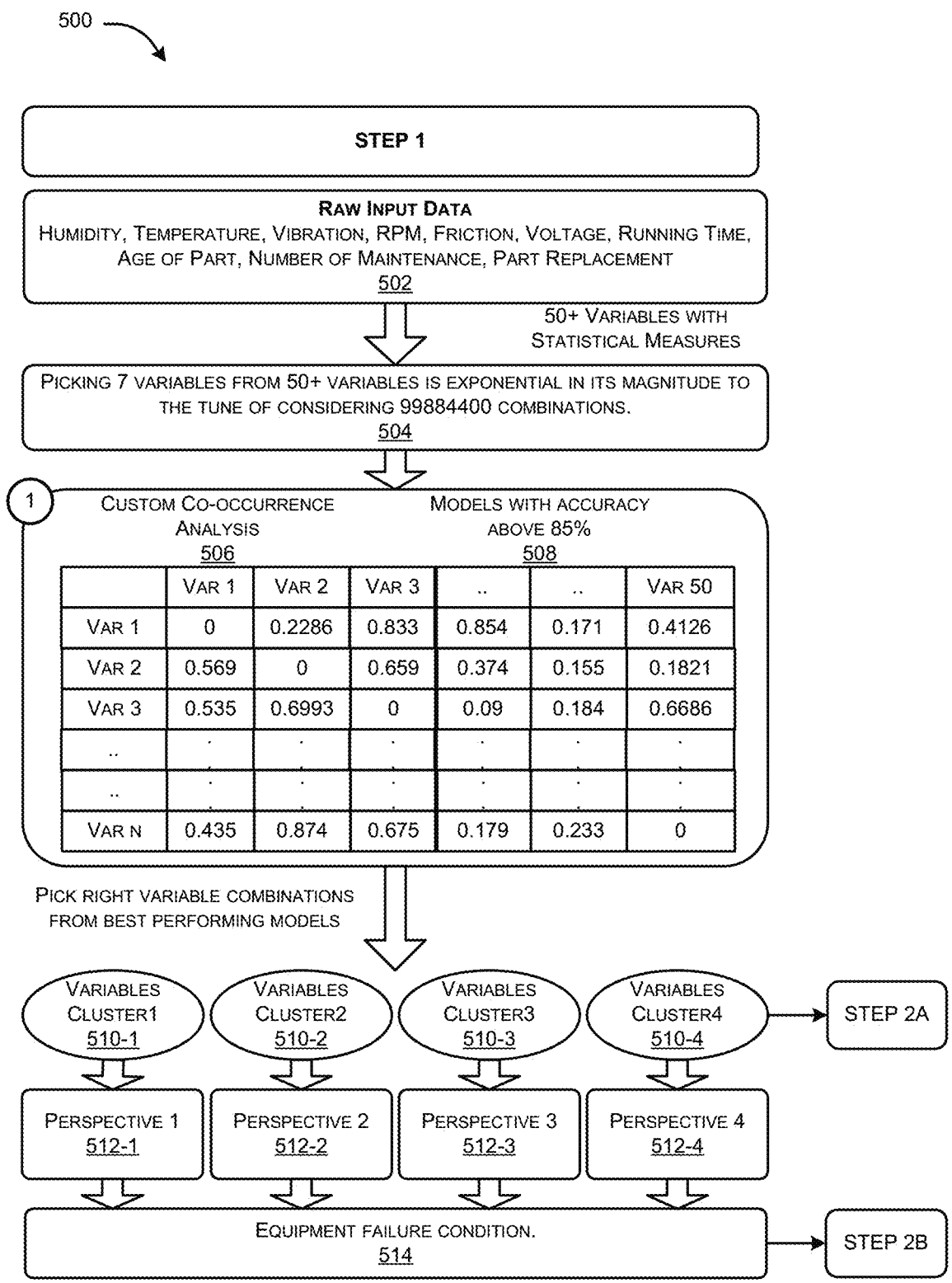
FIG. 5 illustrates an overview for an exemplary representation for generation of discrete perspectives corresponding to an insight pertaining to a deviation, according to an example embodiment of the present disclosure.

FIG. 5 illustrates an overview 500 for an exemplary representation for generation of discrete perspectives corresponding to an insight pertaining to a deviation, according to an example embodiment of the present disclosure. As illustrated in FIG. 5, the raw input data 502 may include variables such as, for example, humidity, temperature, vibration, rpm, friction, voltage, running time, age of part, number of maintenance, part replacement. these variables may correspond to multiple statistical variables pertaining to at least one of mean, standard deviation, variance, kurtosis, and skew. This may lead to 50 or more statistical variables. based on which, the system may pick up a certain number of variables. For example, 7 variables may be chosen from 50 or more variables (504), which may be exponential in its magnitude to around 99884400 combinations. Based on the statistical variables, the analysis pertaining to co-occurrence of the statistical variables may be performed by using, for example, custom co-occurrence analysis (506). This may include assessment of various combinations of variables, out of which, only the variables that co-occur may be identified. Specifically, in an example embodiment, the co-occurrence may be assessed to check if the combination of variables that co-occur with each other, appear in a historical data processed by at least one trained model having a prediction accuracy above 80% or 85% (as shown at 508). If the combinations have co-occurred in the trained model with a prediction accuracy above 80%, then such combinations may be used to identify at least one endorsed group. The endorsed group may be assessed to evaluate for consistency of occurrence of the statistical variables across the endorsed groups to obtain variable clusters 1-4 illustrated as 510-1, 510-2, 510-3, 510-4 respectively (further used in step 2A of FIG. 4). The variable clusters may be evaluated to obtain discrete perspectives 1-4 illustrated as 512-1, 512-2, 512-3, 512-4 respectively. The discrete perspectives may correspond to the insight pertaining to a deviation and may enable to predict failure of equipment and other aspects (such as EOL) pertaining to the equipment. Each variables cluster/discrete perspective may involve right combinations of variables from the best performing models for improved accuracy. The discrete perspectives may be assessed to evaluate condition and timeline of failure of the equipment at the location (at 514) (further used in step 2B of FIG. 4). It may be appreciated that the number of variables chosen as well as the number of variable combinations, the number of variable clusters and/or the number of discrete perspectives may vary based on the application and/or the equipment.

Figure 6A:
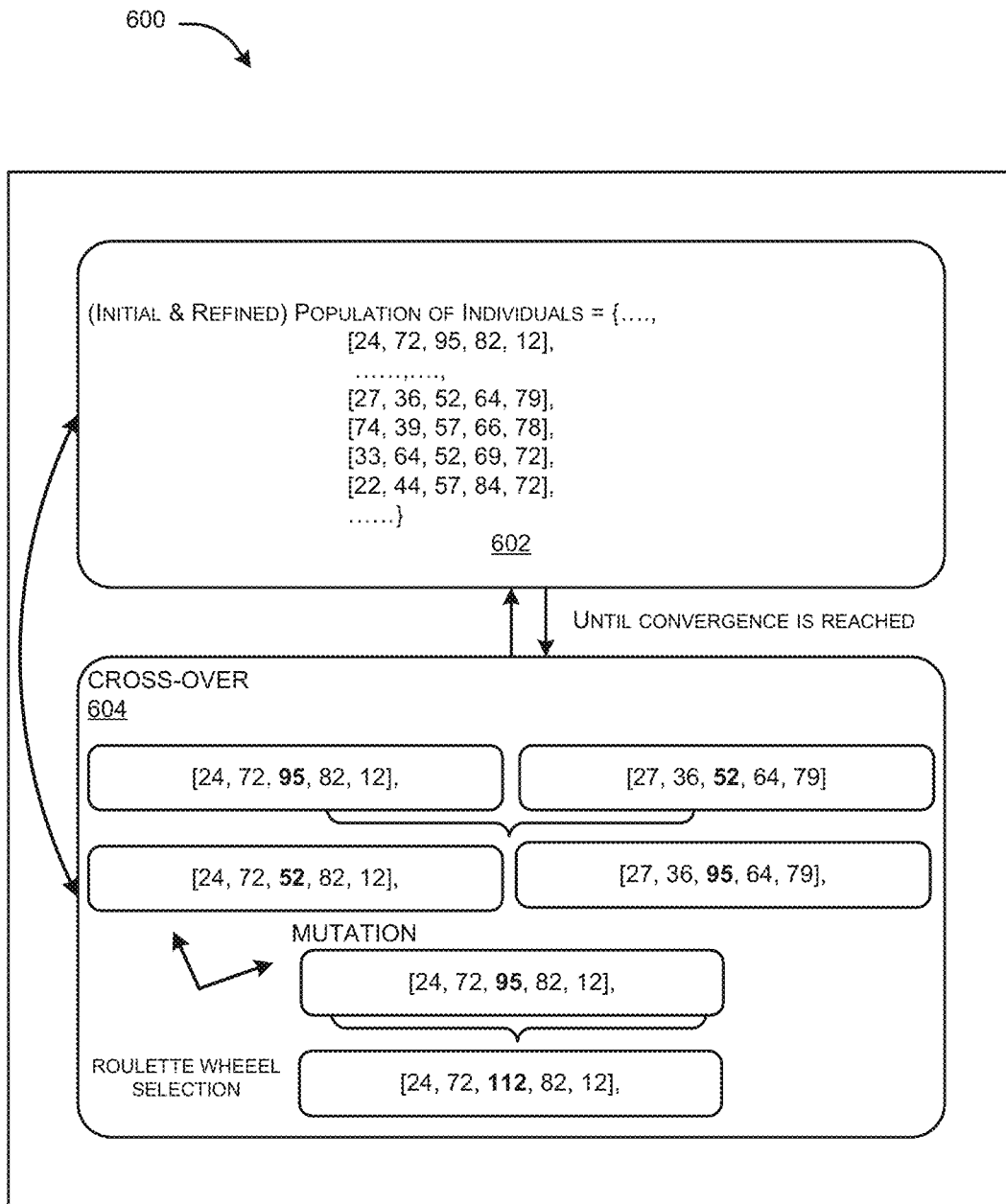
FIG. 6A illustrates an overview for an exemplary representation of cross-over step and a mutation step of genetic algorithm, according to an example embodiment of the present disclosure.

In an embodiment, the endorsed group may be identified by using a genetic algorithm that performs at least one of a cross-over step and a mutation step on the statistical variables. FIG. 6A illustrates an overview 600 for an exemplary representation of cross-over step and a mutation step of genetic algorithm, according to an example embodiment of the present disclosure. As illustrated in 602, the genetic algorithm may be used to identify a set of healthy combinations of variables to assess the co-occurrence. The genetic algorithm may consider an initial and refined population of variables (also referred to as individuals) (as shown in 602) from a huge combination of variables. For example, the initial population may include combinations such as [24, 72, 95, 82, 12], ..., ..., [27, 36, 52, 64, 79], [74, 39, 57, 66, 78], [33, 64, 52, 69, 72], [22, 44, 57, 84, 72], ... and so on. The values in the bracket may represent the values of the statistical variables. For example, in the combination [24, 72, 95, 82, 12], the value "24" may indicate "RPM standard deviation", the value "72" may indicate "temperature mean" and so on. The genetic algorithm may be used to perform a repetitive steps of cross-over (604) and mutation of the combination of statistical variables until a convergence is reached. Once the healthy variable combinations are identified, the co-occurrence and consistency across the best performing models may be performed as explained in FIG. 5.

Figure 6B:
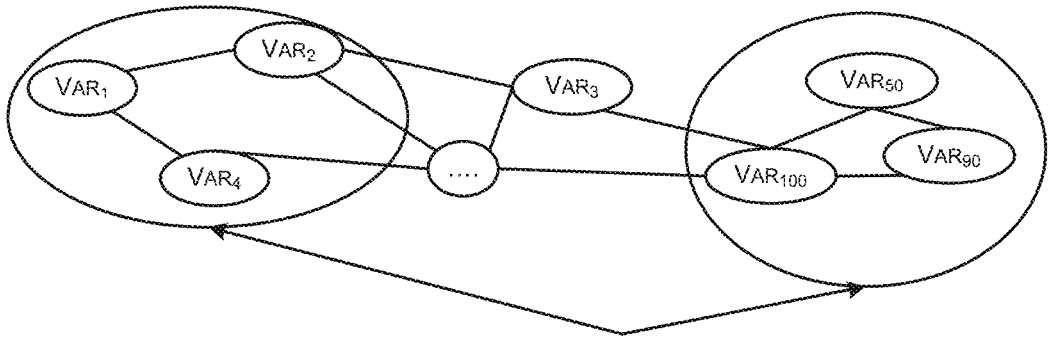
FIG. 6B illustrates an overview for an exemplary representation for identification of variable clusters, according to an example embodiment of the present disclosure.
Figure 6C:
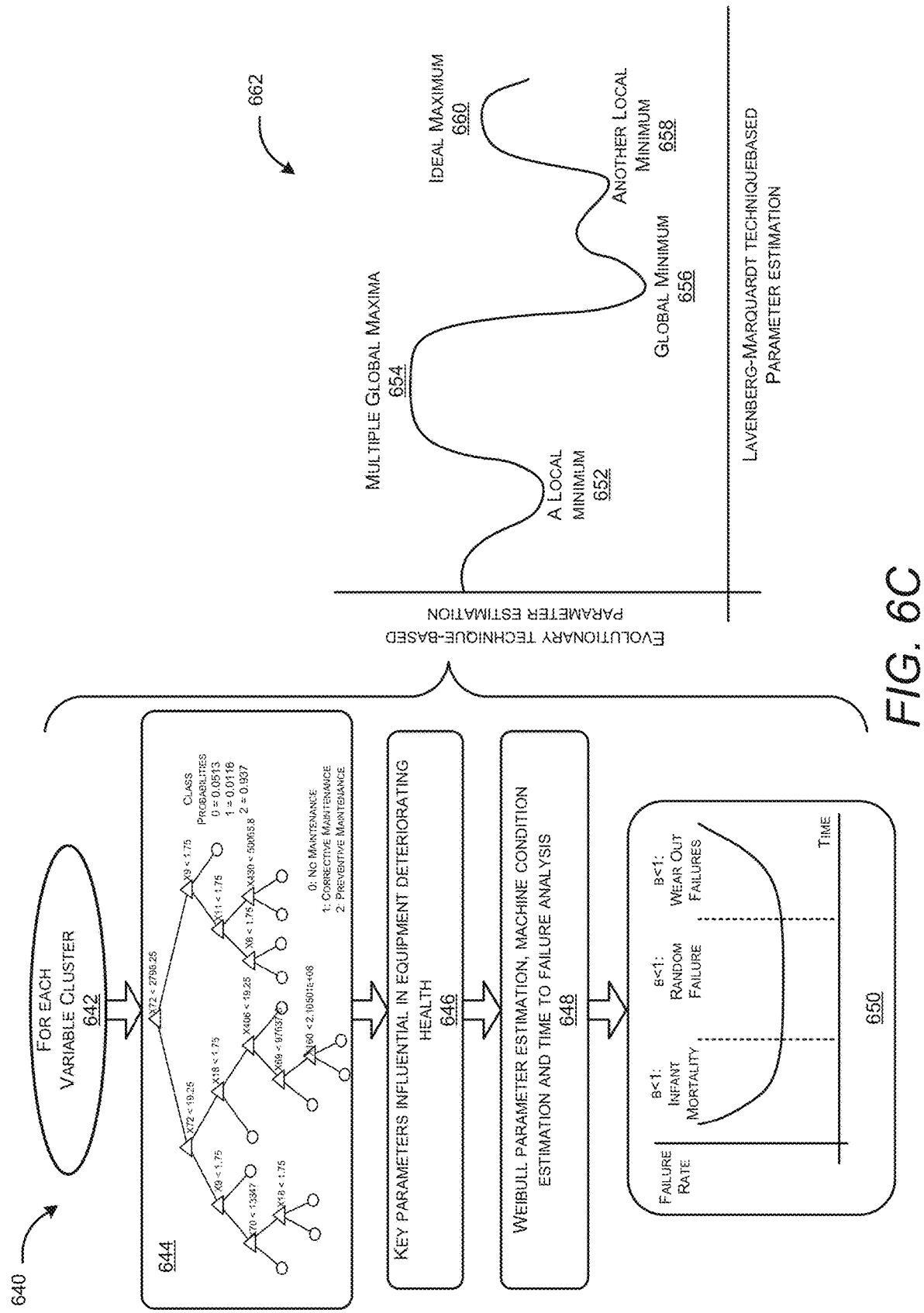
FIG. 6C illustrates an overview for an exemplary representation for estimation of mean time to failure (MTTF) calculation, according to an example embodiment of the present disclosure.

FIG. 6B illustrates an overview 620 for an exemplary representation of identifying variable clusters 642, according to an example embodiment of the present disclosure. Based on the chosen statistical variables, the combinations may be analyzed across best performing models with prediction accuracy above 80%, as shown at 622. For example, each combination may be assessed across models M1, M2, M3 ... Mn. Based on these combinations, the consistency of occurrence may be checked. This may be done by listing variables (626) to derive a number of statistical variables that occur best performing models (i.e. models with greater than 80% accuracy). For example, for 100 variables, based on the listed statistical variables, consistency of occurrence of the variables may be checked. This may be done by normalized co-occurrence consistency likelihood between two variables $Var_i$ and $Var_j$ (as shown in 624). If the combinations of variables have co-occurred in the trained model with a prediction accuracy above 80%, then such combinations may be used to identify at least one endorsed group. The endorsed group may be assessed to evaluate for consistency of occurrence of the statistical variables across the endorsed groups to obtain variable clusters 642.

Referring back to FIG. 4 and step 2A therein, the variable clusters obtained at 412, are used for determining a key parameter related to the variable that is influential in deteriorating the condition of the equipment (at 416). The variable clusters are also used to estimate Weibull parameter estimation to address global/local optima conundrum for MTTF analysis (418). The variable clusters are also used to perform MTTF calculation in conjunction with dynamic threshold determination (420), as explained in detail in FIG. 60. The term MTTF may refer to mean time to failure that is a product performance measure depicting average time elapsed between two consecutive failures and also may be an indication of deterioration in the condition of the equipment. FIG. 60 illustrates an overview 640 for an exemplary representation for estimation of mean time to failure (MTTF) calculation (step 2A of FIG. 4), according to an example embodiment of the present disclosure. As shown in FIG. 60, each variable cluster 642 (may be processed to identify a key parameter related to the variable that is influential in deteriorating the condition of the equipment (646). In an embodiment, each variable cluster may be assessed by forming a decision tree as shown in 644. In the decision tree, each variable from the variable cluster 642 may related to probabilities of an outcome. For example, the outcome may pertain to no maintenance (indicated as 0), corrective maintenance (indicated as 1) and preventive maintenance (indicated as 2). Upon analysis of the decision tree by deriving the class probabilities for variables pertaining to the equipment, the variable at the top of the decision tree is determined such that this variable is considered as a key parameter 646 for further analysis. The key parameter 646 mainly indicates the key variable that may be influential in deterioration of health/condition of the equipment. Based on the key parameter (646), further computing may involve Weibull parameter estimation 648) for evaluation of machine condition and failure analysis by generating a life cycle graph of the key parameter with respect to time (662).

The Weibull parameter estimation may involve the following equation:

$$f(x)=ab^{-1}\{(x-c)/b\}^{a-1}\exp[-\{(x-c)/b\}^a](x>c;a,b>0)$$

where f(x)—Root node variable derived from variable cluster (i.e. pertaining to top of decision tree 644);
'x'—Time variable;
a—Shape parameter;
b—Scale parameter;
c—Location parameter.

In an embodiment, using the life cycle graph of the key parameter, a dual step method may be used to obtain a local optima and a global optima. In the first step, the local optima may be obtained by selecting data-driven near optimal start values (initial parameters) using at least one of particle swarm optimization, Ant colony optimization and Artificial bee colony optimization ensemble approach. The initial parameters may be local optimized parameters. In an example embodiment, genetic algorithm may be used to estimate initial parameters (optimal start values). To estimate the initial parameters, the genetic algorithm may start with (1) initializing a parameter with random values;
(2) computing a gradient of object function;
(3) updated the parameters using the gradient;
(4) calculating a step size using the gradient and tunable hyper parameter learning rate;

(5) calculating parameters, wherein the parameters may be represented as (old parameters—step size). The steps 2-5 may be repeated until convergence is obtained. The genetic algorithm may perform repeated convergence based on the below equation to identify the new parameters.

$$\theta_j := \theta_j - \alpha \frac{1}{m} \sum_{i=1}^{m} (h_\theta(x^{(i)}) - y^{(i)}) x_j^{(i)}$$

Upon identification of the initial parameters, in the second step (of the dual step method), the parameters may be fine-tuned using gradient descent algorithms for better precision and accuracy. In an embodiment, the local minimum 652 and 658 may be the parameters obtained initially, and upon fine tuning, a global minimum 656 may be obtained. Similarly, multiple global maxima 654 may be generated, and, upon further fine tuning, the ideal maximum 660 may be obtained. In an example embodiment, the initial parameters may be fine-tuned using deterministic Lavenberg—Marquardt Newton parameter estimation technique to obtain the global optima value (656). The life cycle graph of the key parameter is used for estimating mean time to failure (MTTF) (662). MTTF may refer to mean time to failure that is a equipment performance measure depicting average time elapsed between two consecutive failures and may be an indication of deterioration in the condition of the equipment. The MTTF may resemble a graph as shown in 650, which resembles a human life cycle having relatively higher failure rate at the extreme ends with steady performance between the two extreme ends. The MTTF would enable to understand an estimated timeline for failure or deterioration of the equipment in the future. In an embodiment, the MTTF calculation may be performed in conjunction with dynamic threshold determination. The dynamic threshold determination may dynamically evaluate threshold limits for the variables that may lead to possible failure or deterioration of the equipment in the future. In an embodiment, the variation of influential parameters against time is also determined as an ensemble of the above mentioned methods or algorithms.

Figure 6D:
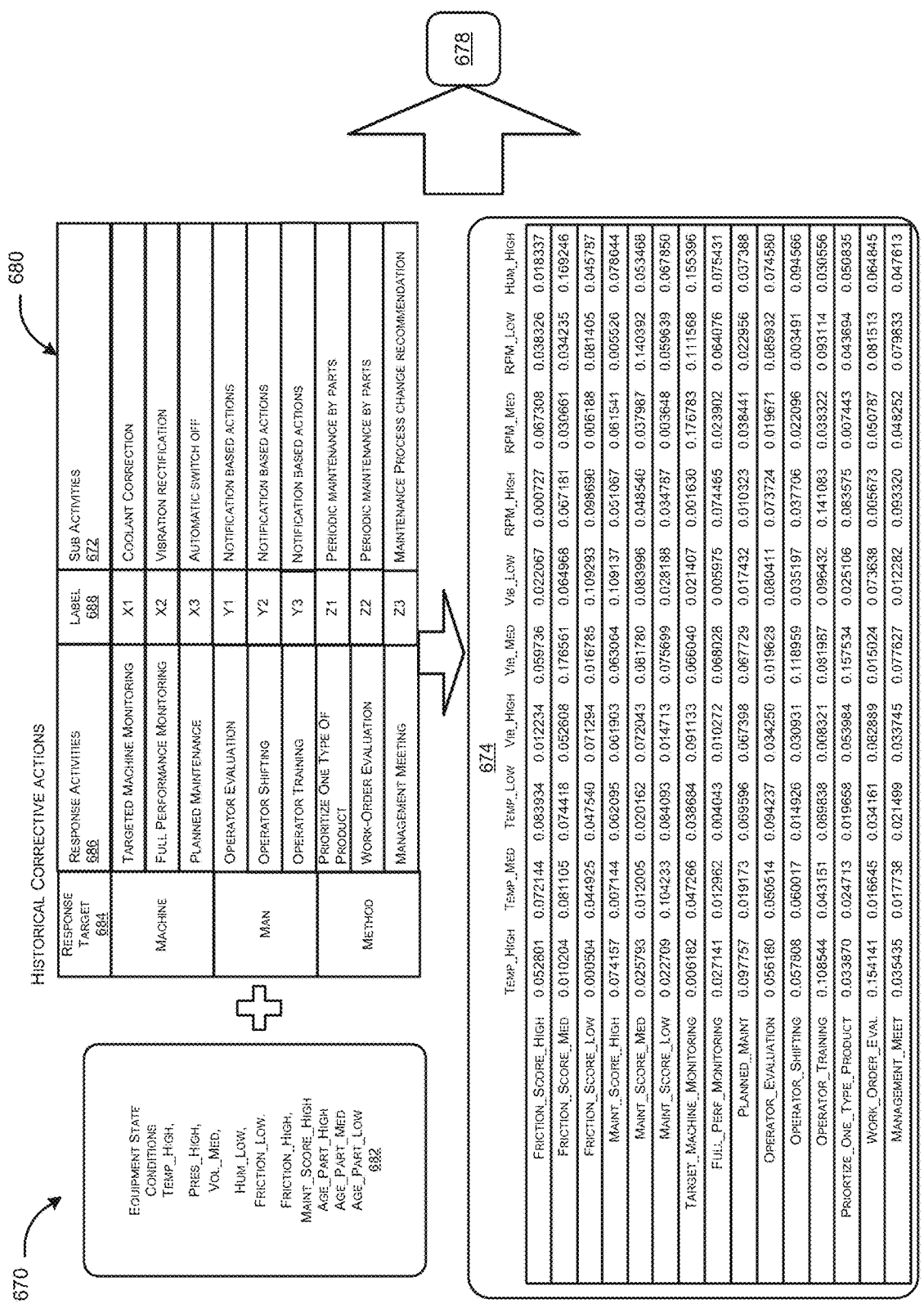
FIG. 6D illustrates an overview for an exemplary representation for mining association between state of the variable of the equipment and the respective remedial action, according to an example embodiment of the present disclosure.
Figure 6E:
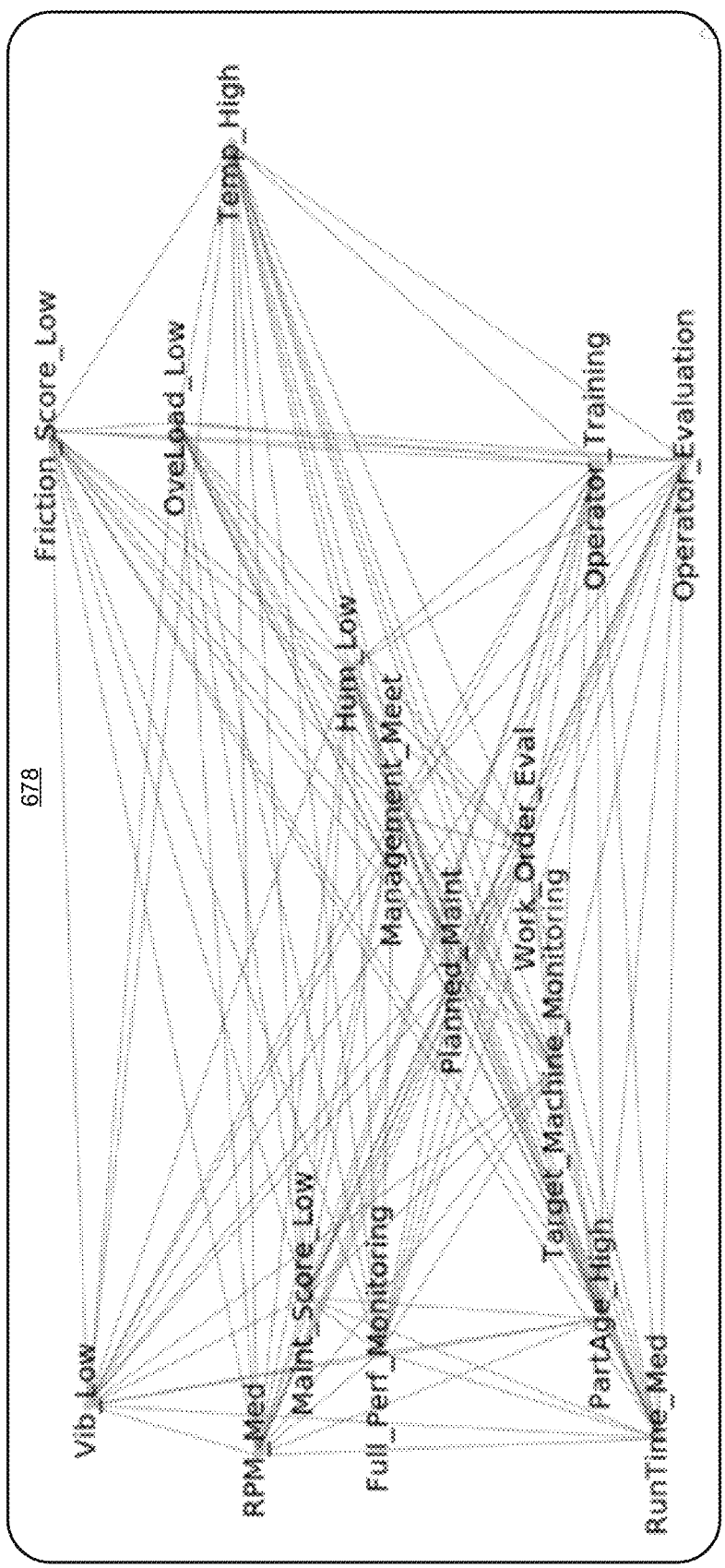
FIG. 6E illustrates an overview of an exemplary clique that depicts rare association between state of the variable of the equipment and the respective remedial action, according to an example embodiment of the present disclosure.

Referring back to FIG. 4 and step 23 therein, the discrete perspectives obtained at 414 may be used to relate union of all the variables across clusters with historical corrective actions (422). This may be done by mining rare associations between discrete states of the equipment and remedial actions to recommend corrective action (424), as explained in detail in FIG. 6D. FIG. 6D illustrates an overview 670 for an exemplary representation for mining association between state of the variable of the equipment and the respective remedial action (step 23 of FIG. 4), according to an example embodiment of the present disclosure. As shown in FIG. 6D, the discrete perspectives (obtained from step 1 of FIG. 4) is processed to interrelate the variables across each variable duster with historical corrective actions (as shown in 680) to obtain a clique 678. FIG. 6E illustrates an overview 678 of an exemplary clique that depicts rare association between state of the variable of the equipment and the respective remedial action, according to an example embodiment of the present disclosure. The clique may represent an association between a state of the variable of the equipment and the respective remedial action. The association may be mined to suggest corrective actions for a particular deviation or an event that involves need for an immediate action. Based on the suggested corrective actions, the system may enable instant regulation of deviation (resolving the event by automated actuation or manually). The association is mined by relating equipment states (682) with remedial actions based on patterns identified in historical data. As shown at 682 in FIG. 6D, the variables pertaining to the equipment may include several states such as, for example, temperature can be "high", "medium or low", thus including 3 discrete states. Similarly, vibration may be "high", "medium" or "low", thus indicating 3 discrete states. Several other states for variables may be possible as shown in the column titles of table shown in 674. Each state of the variable may represent a condition/state of the equipment for which the historical corrective action may have been suggested in the past i.e. as per historical data. The remedial actions may be referred to as "label(s)" as shown in 688 in table 680. The labels 688 may correspond to one or more response activities to be performed by machine, operator (man), or method (as shown in 684). For example, the response activities that may performed by machine may include a targeted machine monitoring (label X1) and may be linked to an associated action such as, for example, coolant correction by automated actuation. Similarly, for example, the response activities that may performed by man may include operator evaluation (label Y1) and may be linked to an associated action such as, for example, notification based action. Similarly, for example, the response activities that may be method-based may include prioritizing one type of product (label Z1) and may be linked to an associated action such as, for example, periodic maintenance of parts/components of the equipment. It may be appreciated that obtaining historical corrective action and/or exhaustive labeled data may not be straightforward as all corrective actions may not possible to cover by relying only on limited historical data. Further, in case of equipment maintenance, the amount of labels or labeled data may be limited, because the sensor data, which is captured in real-time, may be of high volume, thus making it challenging to assign labels. However, the present disclosure addresses this concern by considering the limited historical corrective action and the state, based on which, an association may be mined therebetween. The association may be mined by considering co-occurrence between 2 states of the variable and the respective historical corrective action suggested in the past for at least one of the 2 states. For example, temperature and vibration may be variables, wherein both may be "low" state. If a historical remedial action (such as operator evaluation (as shown in 686) may be suggested in the past for "low" state of "temp" then the same can be extrapolated to "low" state of vibration. In another example, temperature and vibration may be variables, wherein both may be "high" state. If a historical remedial action (such as management meet) may be suggested in the past for "high" state of "temp" then the same can be extrapolated to "high" state of vibration. Thus, the co-occurrence of 2 states of variable may be normalized to extrapolate the limited historical corrective action for a number of other states of variable for which a historical corrective action may not be available, thus enabling new assignment of labels (i.e. suggestion of remedial action) that may not be part of historical corrective action. It may be appreciated that the mentioned examples are only suggested for the sake of understanding and the associations may be more complicated in nature. In an example embodiment, the association may be mined by at least one of a ensemble approach, ensembled clustering and base classifier prediction. Thus, the mining of the association is done to arrive at the remedial action. Using the present approach, it may be possible to suggest a remedial action, which may be further executed by actuation as explained in FIG. 7A.

Figure 7A:
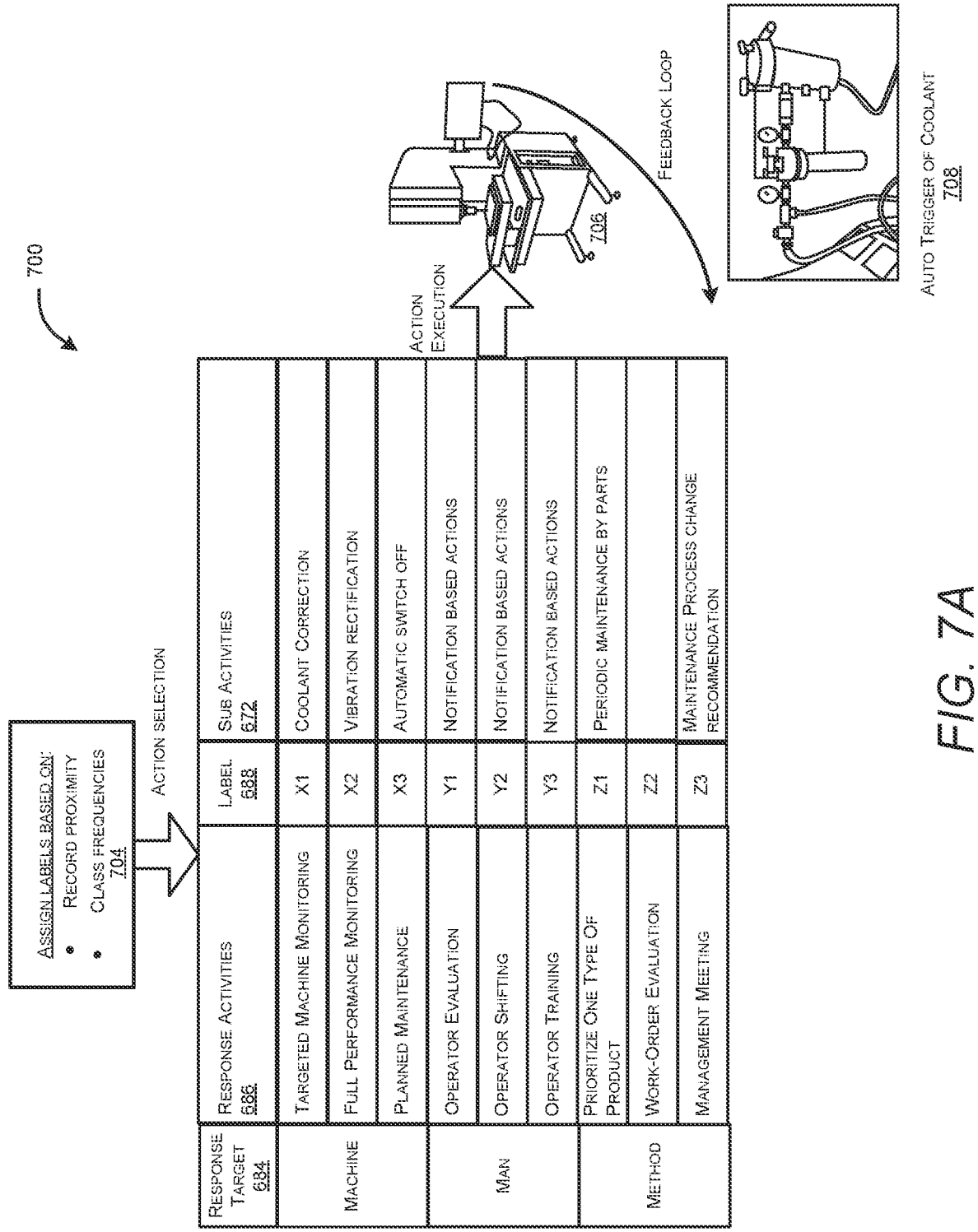
FIG. 7A illustrates an overview for an exemplary representation for implementation of a remedial action, according to an example embodiment of the present disclosure.

FIG. 7A illustrates an overview 700 for an exemplary representation for implementation of remedial action (step 2B of FIG. 4), according to an example embodiment of the present disclosure. As shown in FIG. 7A and as explained hereinabove, the association may be mined assigning labels (704) to states of variable (for which historical corrective action may not be available) by extrapolation of limited historical correction actions. The labels by one or more approaches such as, for example, by record proximity and/or by class frequencies, as described later in FIGS. 7B-7D. Referring to FIG. 7A, based on the assigned label for a record, a remedial action may be selected (686, 672) and executed to perform the remedial action. In an example embodiment, the equipment may be coupled to an actuator for performing the automated actuation for regulation of the deviation. The automated actuation may be performed by sending a feedback to the actuator to recommend the remedial action. For example, if state of variable such as "temperature" of the equipment (706) may be "high", the system may send the recommended remedial action in the form of feedback "auto-trigger of coolant" to the actuator coupled to a coolant circulation device (708). Based on the feedback, the actuator may perform the required actuation. In an example embodiment, the actuator performs the actuation based on the feedback received from the respective edge computing node at the location. Thus, the edge computing node provides recommendation of the remedial action immediately, thus enabling immediate action based on local edge processing and avoiding need for cloud based recommendation. In an example embodiment, the actuator may be at least one of a mechanical actuator, an electromechanical actuator, a pneumatic actuator, a magnetic actuator, a relay based actuator, an electromagnetic actuator, a hydraulic actuator, a piezoelectric actuator and a thermal actuator. One of ordinary skill in the art, the present disclosure may not be limited by the mentioned actuators and several other types of actuating means and/or actuators may be used without departing from the scope of the disclosure.

Figures 7C, 7D:
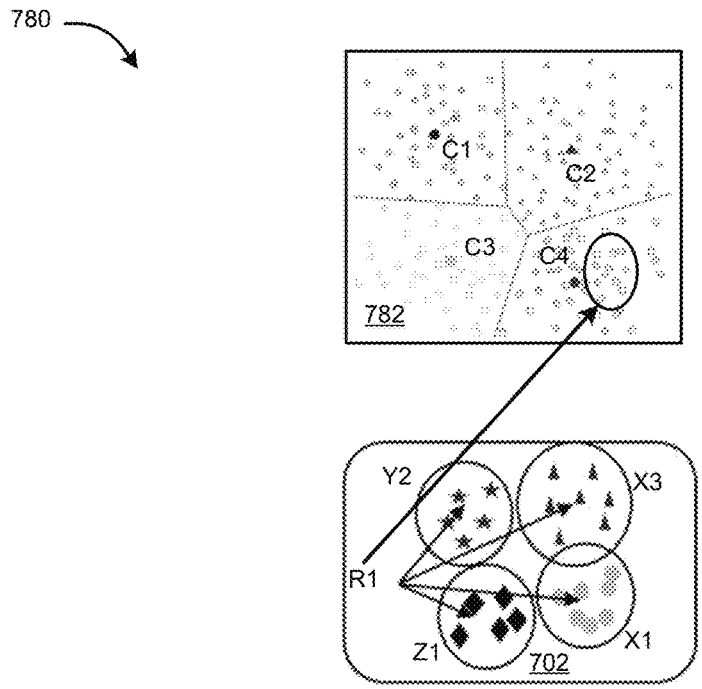

As mentioned in the present disclosure, the labels may be assigned by extrapolating historical corrective actions, as covered in FIGS. 7B-7D. FIGS. 7B-7D illustrate an overview 720, 740 and 780 for an exemplary representation for ensemble approach for assignment of labels (for improvement in percentage of labelled data), according to an example embodiment of the present disclosure. In an example embodiment, the first processor 104 of the respective edge computing node 102 at the location may perform the assignment of labels. As shown in 724 of FIG. 7B, the first processor may include a model that may predict probabilities (722) of labels for multiple records 732, wherein the multiple records 732 are shown in rows and labels are shown in columns. Each record may correspond to a state of the variable of the equipment (such as, for example, states "high", "medium", low") and the probabilities may correspond to the possibility to recommend the remedial action (corresponding to the label). As shown in 726, the probability (722) of labels for multiple records 732 may be sorted. In an example embodiment, the probabilities (722) of labels may be sorted in an descending order starting with highest probability as shown in 734. Various other ways of sorting may be implemented. Based on the sorted probabilities, the model may assign a label (736 as shown in table 728) based on if the value of the probabilities exceed a predefined threshold (Significant Probability Threshold) (730). In an example embodiment, if the value of the probabilities do exceed the predefined threshold (730), the record may not be assigned a label. In an example embodiment, the record that are not assigned labels may be sent back to model predictions after previous iteration record labels are updated in database. In an embodiment, a mere consideration significant probability may not be effective and hence the technique described in FIG. 7B may be combined with the techniques of FIGS. 7C and 7D. As shown in 740 of FIG. 7C, the first processor 104 of the respective edge computing node 102 may perform clustering based on labelled and unlabeled records to obtain multiple dusters 742 denoted as C1, C2, C3 C4 with labels 744. The multiple clusters may be analyzed to determine a duster belongingness on unlabeled records (as shown in 756) based on which labels may be assigned. In an embodiment, labels may be assigned based on proximity of the record to a centroid of the respective dusters. As shown in 758, once it may be identified that the record 746 belongs to a specific identified duster 748, the frequent label in the identified cluster (for example, in column 750, Y2 has highest frequency of 15 for record 1) may be selected to assign label (752) to the respective record. In another embodiment and as shown in illustration 770 in FIG. 7D, another approach may be based on proximity (rather than frequency) as shown in 702 and 782, in which distance between the unlabeled record (for example R1) and a centroid of labelled record may be calculated. In an example embodiment, an ensemble clustering approach or a consensual approach based on techniques described in FIGS. 7B, 7C and 7D may be used to facilitate accounting for dynamic changes in data. In one example embodiment, an algorithm including at least one of Gaussian mixture modeling, Fuzzy C means clustering, DBSCAN may also be implemented.

Figure 8A:
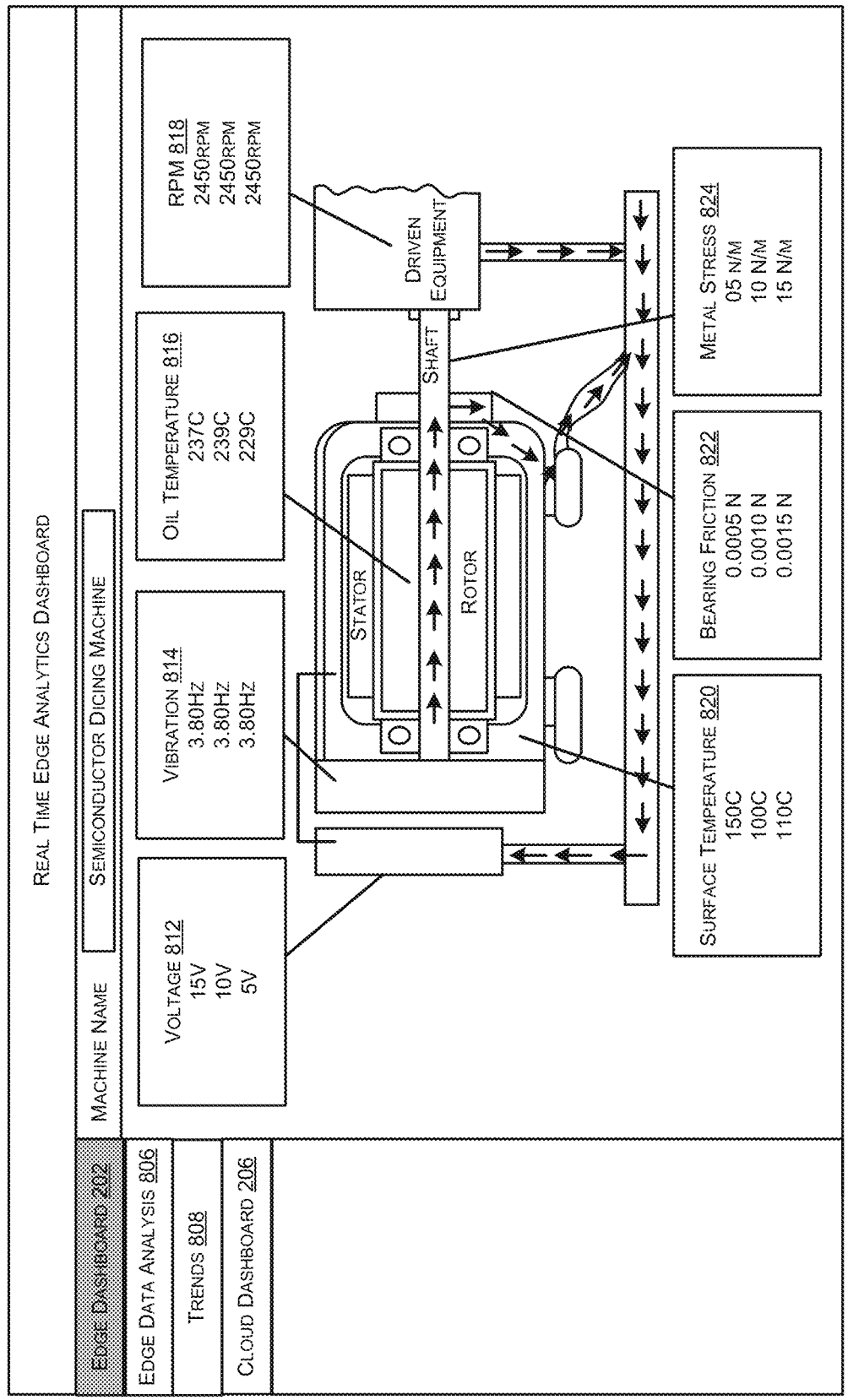

Referring back to FIG. 2A, the dashboard 214 is further elaborated in FIGS. 8A-8D, which illustrate overview (800, 840, 870, 880), according to an example embodiment of the present disclosure. In FIG. 8A, the edge dashboard 202 (as also shown in FIG. 2A) is shown for an equipment such as "semiconductor dicing machine". The equipment may be associated with variables including, for example, voltage (812), vibration 814, oil temperature 816, RPM (818), surface temperature (820), bearing friction (822) and metal stress (824). Various other variables may also be viewed depending on the type of the equipment. Using the edge dashboard 202, a user or an operator may be able to get a real-time view of the sensed data pertaining to these variables, as sensed by the IoT device. The variables may pertain to specific parts or components of the equipment and/or material contained/accommodated in the parts (such as, for example, oil). The edge dashboard 202, may also enable to get a real-time view of any form of actuation being performed for regulation of a deviation. The system may also include edge data analysis dashboard 806 and trends dashboard 808.

Figure 8B:
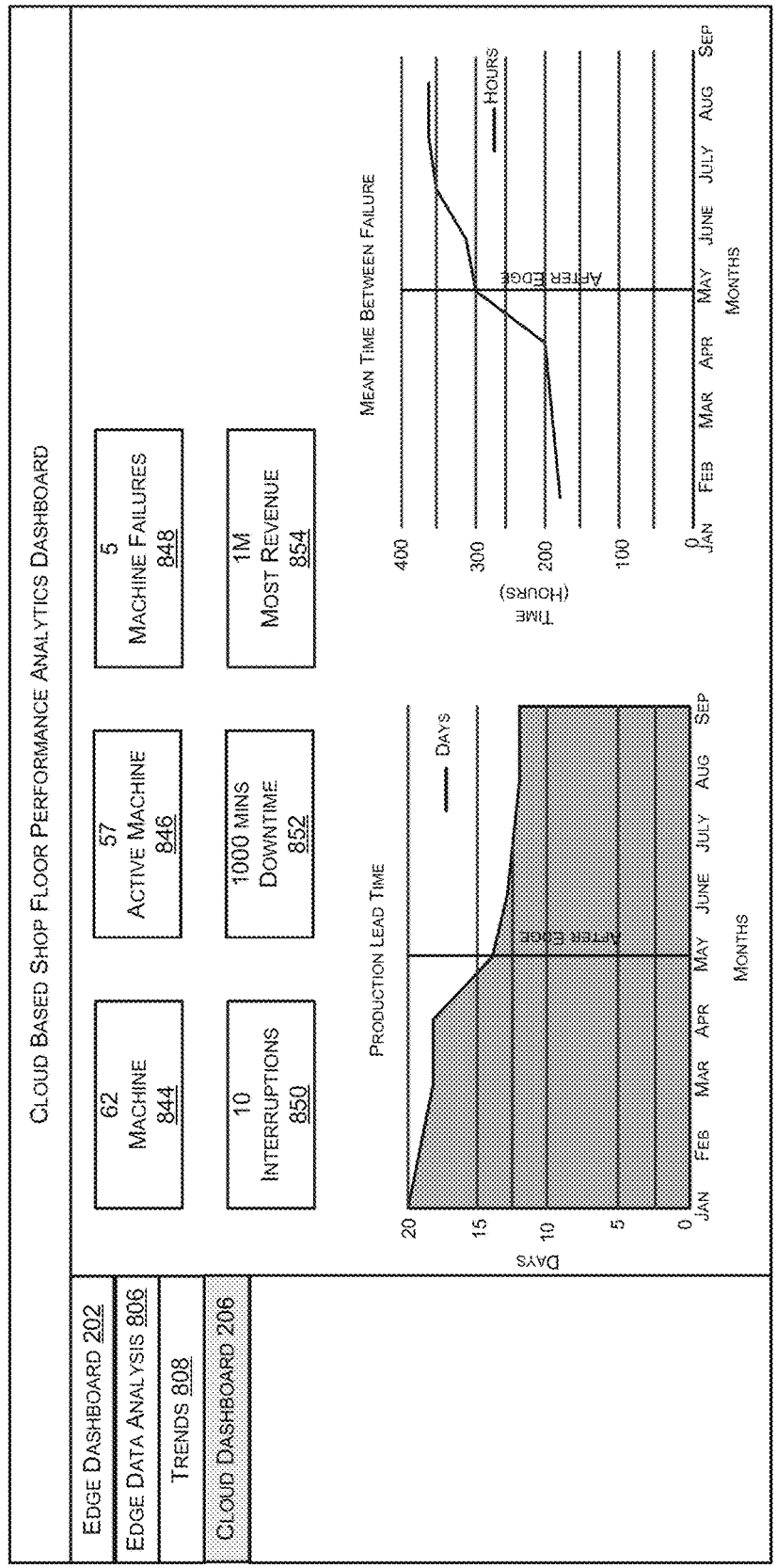
Figure 8C:
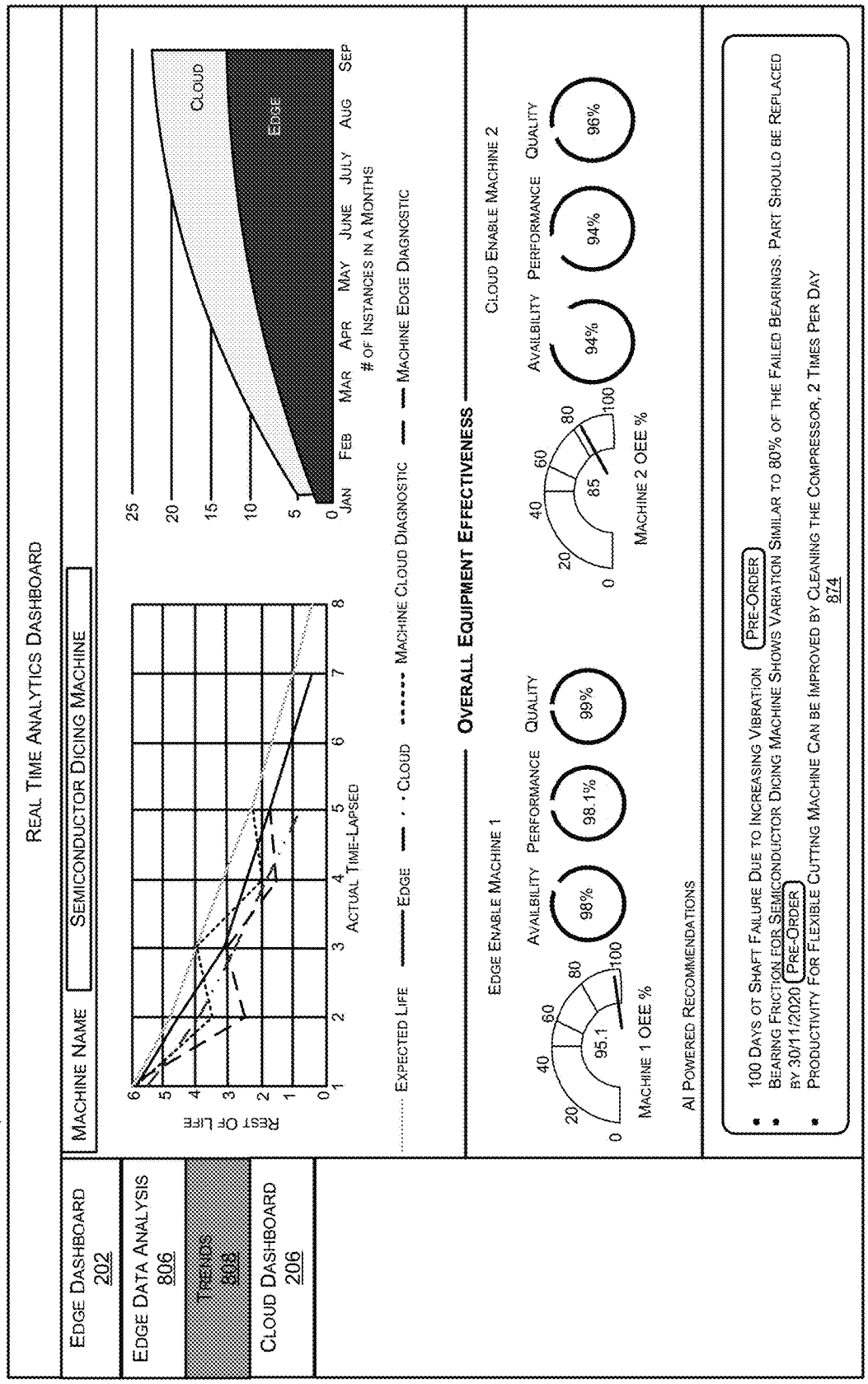
Figure 8D:
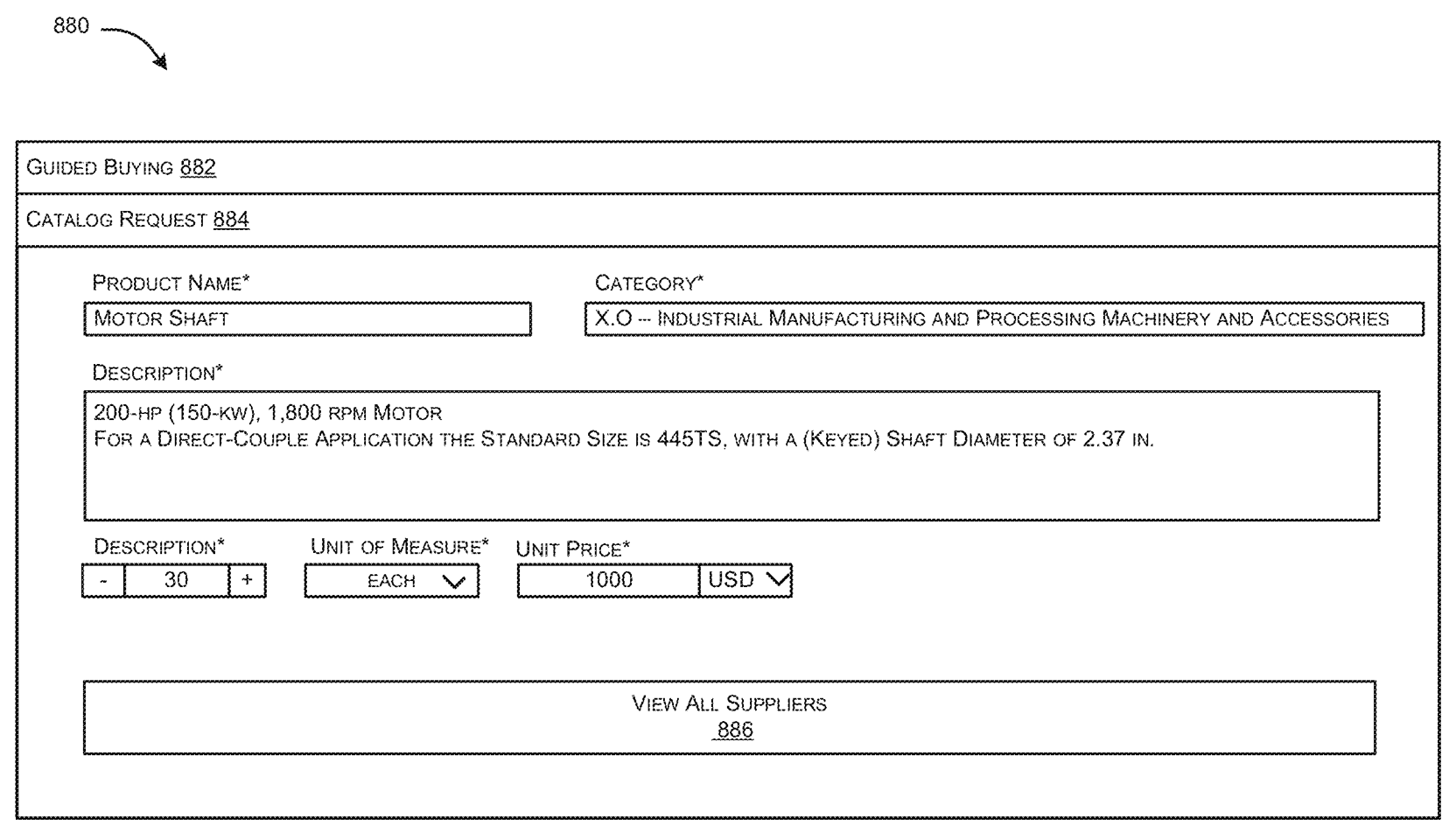

As shown in FIG. 8B, a cloud dashboard 206 may be available to the user for obtaining an overall view from different locations with edge computing nodes 102. The overall view may indicate aspects such as total number of equipment/machines in all locations (844), number of active machines (846), number of machine failures (848), number of interruptions (850), amount of downtime (852) and maximum revenue (854). Various other aspects may also be viewed depending on the requirements of the equipment or the user. Using the cloud dashboard 206, the user may also be able to view various graphical representations, such as, for example, trend of production leas time, MTTF trend and other such aspects. Such aspects may also enable to see month-wise representation to see impact of processing at edge computing node. Further, as shown in 870, the dashboard may also include information of trends dashboard 808. The trends dashboard may indicate one or more trends or patterns pertaining to behavioral aspects of machine over a period of time as assessed by cloud computing device and edge computing device. The trends dashboard 808 also portray trends pertaining to overall equipment effectiveness based on cloud mode and edge mode. The system may include an AI model for providing automated recommendations as shown in 874. The recommendations may pertain to replacement of one or more parts, recommended cleaning of components and other such recommendations. Further, as shown in 880, the dashboard may also include guidance or suggestions (882) for buying the parts/components that need to be replaced based on AI based recommendation. The dashboard may also include catalog request 884 and relevant supplier details (886) to complete the order.

Figure 9:
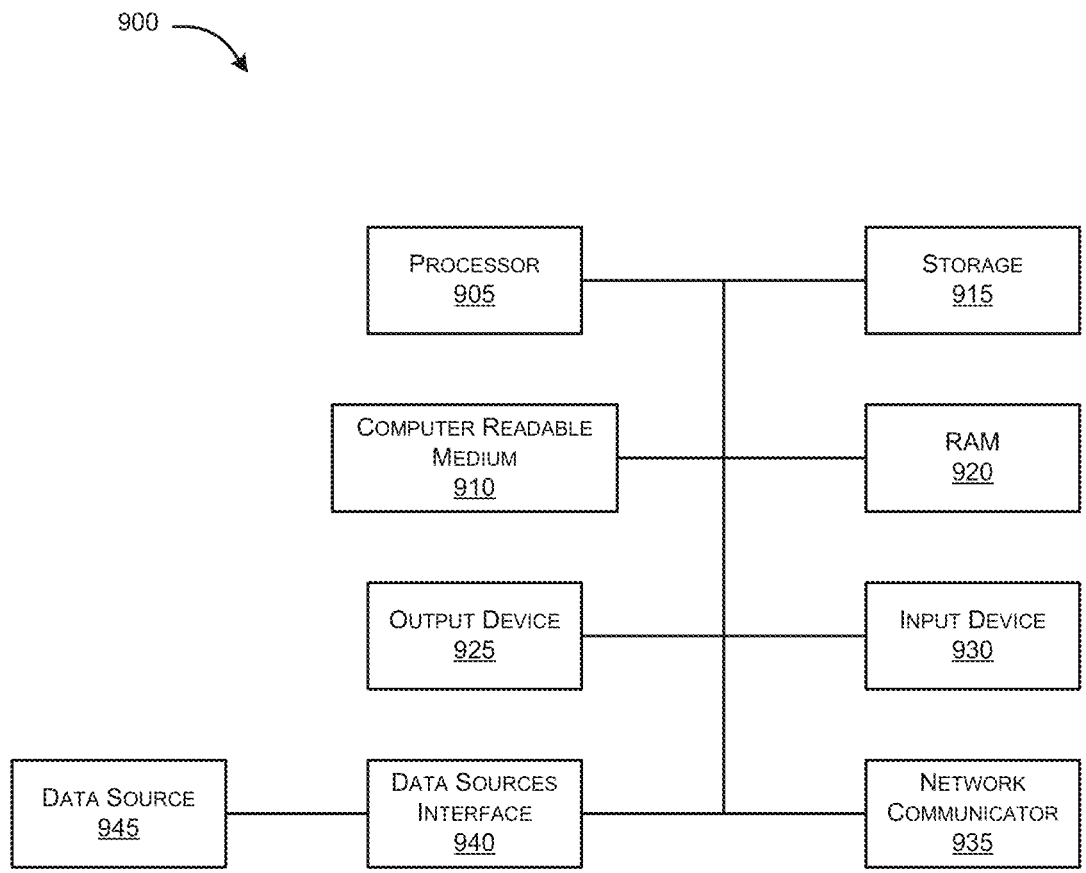
FIG. 9 illustrates a hardware platform (900) for implementation of the disclosed system, according to an example embodiment of the present disclosure.

FIG. 9 illustrates a hardware platform (900) for implementation of the disclosed system, according to an example embodiment of the present disclosure. For the sake of brevity, construction and operational features of the system 100 which are explained in detail above are not explained in detail herein. Particularly, computing machines such as but not limited to internal/external server clusters, quantum computers, desktops, laptops, smartphones, tablets, and wearables which may be used to execute the system 100 or may include the structure of the hardware platform 900. As illustrated, the hardware platform 900 may include additional components not shown, and that some of the components described may be removed and/or modified. For example, a computer system with multiple GPUs may be located on external-cloud platforms including Amazon Web Services, or internal corporate cloud computing clusters, or organizational computing resources, etc.

The hardware platform 900 may be a computer system such as the system 100 that may be used with the embodiments described herein. The computer system may be associated with the edge computing node 102 and/or the cloud computing device 106. The computer system may represent a computational platform that includes components that may be in a server or another computer system. The computer system may execute, by the processor 905 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 905 that executes software instructions or code stored on a non-transitory computer-readable storage medium 910 to perform methods of the present disclosure. The software code includes, for example, instructions for predictive maintenance of an equipment.

The instructions on the computer-readable storage medium 910 are read and stored the instructions in storage 915 or in random access memory (RAM). The storage 915 may provide a space for keeping static data where at least some instructions could be stored for later execution. The stored instructions may be further compiled to generate other representations of the instructions and dynamically stored in the RAM such as RAM 920. The processor 905 may read instructions from the RAM 920 and perform actions as instructed.

The computer system may further include the output device 925 to provide at least some of the results of the execution as output including, for example, display of one or more results. The output device 925 may include a display on computing devices and virtual reality glasses. For example, the display may be a mobile phone screen or a laptop screen, GUIs and/or text may be presented as an output on the display screen. The computer system may further include an input device 930 to provide a user or another device with mechanisms for entering data and/or otherwise interact with the computer system. The input device 930 may include, for example, a keyboard, a keypad, a mouse, or a touchscreen. Each of these output device 925 and input device 930 may be joined by one or more additional peripherals. For example, the output device 925 may be used to display the results related to predictive maintenance of the equipment.

A network communicator 935 may be provided to connect the computer system to a network and in turn to other devices connected to the network including other clients, servers, data stores, and interfaces, for instance. A network communicator 935 may include, for example, a network adapter such as a LAN adapter or a wireless adapter. The computer system may include a data sources interface 940 to access the data source 945. The data source 945 may be an information resource. As an example, a database of exceptions and rules may be provided as the data source 945. Moreover, knowledge repositories and curated data may be other examples of the data source 945.

Figure 10A:
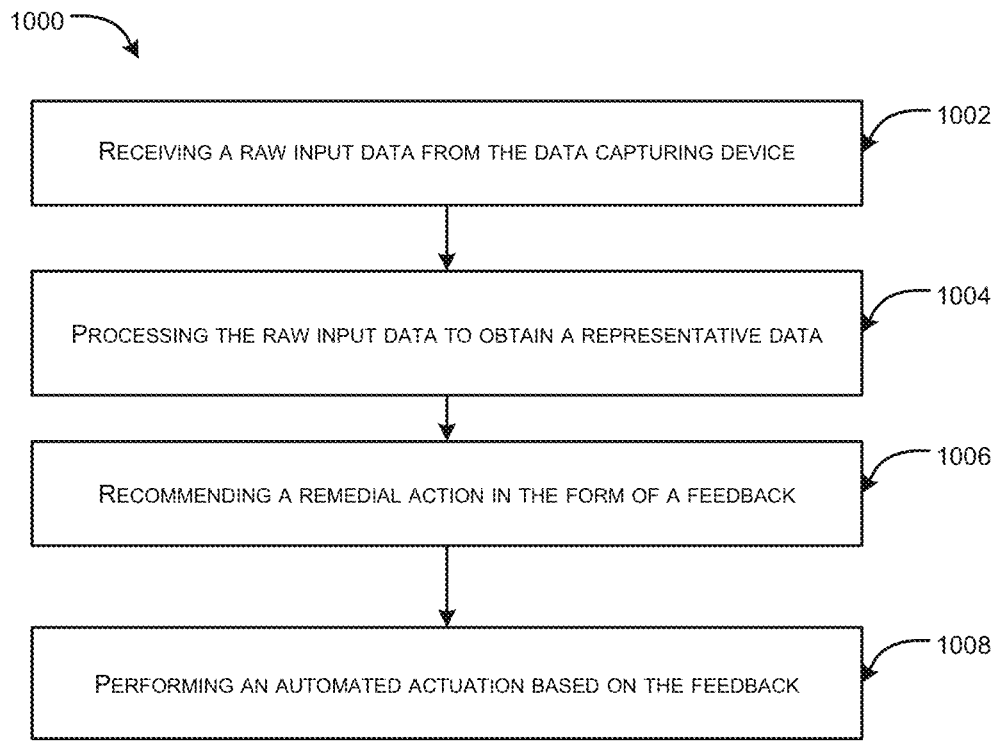
FIGS. 10A-10B illustrate flow diagrams for facilitating for predictive maintenance of an equipment, according to an example embodiment of the present disclosure.
Figure 10B:
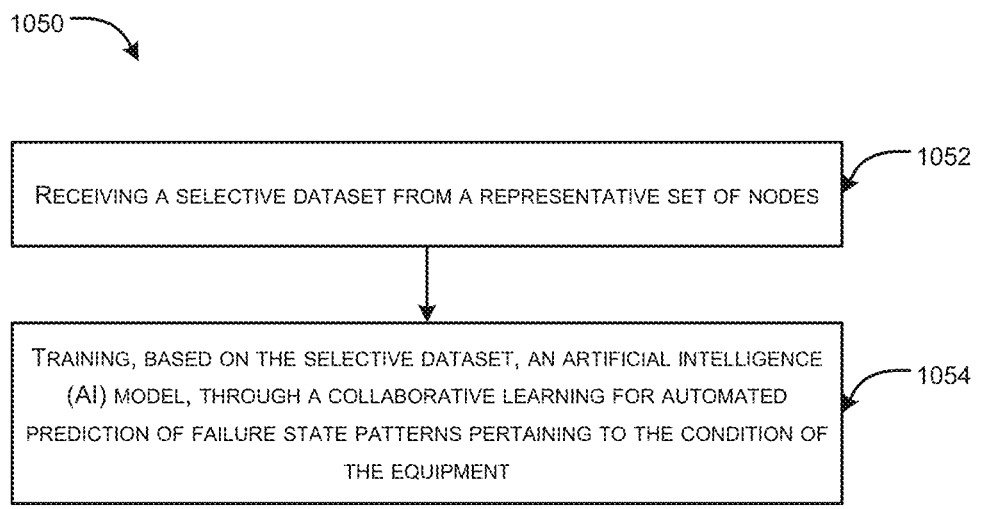

FIGS. 10A-10B illustrate flow diagram (1000 and 1050) for facilitating for predictive maintenance of an equipment, according to an example embodiment of the present disclosure. Referring to FIG. 10A, at 1002, the method includes a step of receiving, by a first processor of an edge computing node, a raw input data from the data capturer. At 1004, the method includes a step of processing, by the first processor, the raw input data to obtain a representative data. The representative data may include an insight pertaining to a deviation in the at least one variable and a corresponding remedial action to be taken to correct the deviation. The deviation may be related to a deterioration in the condition of the equipment. At 1006, the method includes a step recommending, by the first processor, the remedial action in the form of a feedback. At 1008, the method includes a step of performing, by an actuator coupled with the equipment, an automated actuation based on the feedback. Referring to FIG. 10B, at 1052, the method includes a step of receiving, by a second processor, a selective dataset from a representative set of nodes. The second processor may be of a cloud computing device communicably coupled to the edge computing node. The selective dataset may include the representative data from the representative set of nodes selected from plurality of edge computing nodes. The plurality of edge computing nodes may be segmented into multiple groups such that the representative set of nodes are selected from each of the multiple groups. At 1054, the method includes a step of training, by the second processor, based on the selective dataset, an artificial intelligence (AI) model of the second processor. The AI model may be trained by collaborative learning for automated prediction of failure state patterns pertaining to the condition of the equipment. In an example embodiment, the AI model may be trained by adaptive federated learning based on segmentation.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system, comprising:
a plurality of data capturers to capture a raw input data pertaining to at least one variable corresponding to a condition of an equipment, wherein the raw input data comprises at least one of a visual data and a sensor data; and
a plurality of edge computing nodes, wherein each edge computing node is coupled to a respective one of the plurality of data capturers at a location,
wherein each edge computing node comprises a first processor to:
receive the raw input data from the respective one of the plurality of data capturers; and
process the raw input data to obtain a representative data, the representative data corresponding to a representative set of nodes selected from the plurality of edge computing nodes, and comprising;
an insight pertaining to a deviation in the at least one variable, and
a corresponding remedial action to be taken to correct the deviation, the deviation being related to a deterioration in the condition of the equipment,
wherein the plurality of edge computing nodes are segmented into multiple groups, and wherein the representative set of nodes are selected from each of the multiple groups, and
wherein the respective edge computing node at the location facilitates a regulation of the deviation by performing an automated actuation based on the corresponding remedial action.

2. The system as claimed in claim 1, wherein the system comprises:
a cloud computing device communicably coupled to the plurality of edge computing nodes, wherein the cloud computing device comprises a second processor to:
receive a selective dataset from the representative set of nodes, wherein the selective dataset comprises the representative data from the representative set of nodes selected from the plurality of edge computing nodes; and
train, based on the selective dataset, an artificial intelligence (AI) model of the second processor, through a collaborative learning for automated prediction of failure state patterns pertaining to the condition of the equipment, wherein the AI model is trained by adaptive federated learning based on segmentation.

3. The system as claimed in claim 2, wherein the adaptive federated learning based on segmentation comprises implementation of a set of individual AI models such that each individual AI model is associated with at least one of the multiple groups, and wherein the segmentation of the plurality of edge computing nodes is performed based on k-means clustering.

4. The system as claimed in claim 2, wherein the representative set of nodes are identified by assessing a deflection in expected values of the at least one variable beyond a predefined threshold, wherein the deflection is identified by evaluation of an outlier data that is obtained by assessing a set of records against a predefined set of rules to obtain a conformance score such that the nodes with minimal value of the conformance score are selected as the representative set of nodes, and wherein each record indicates a discrete state pertaining to the at least one variable.

5. The system as claimed in claim 2, wherein the failure state patterns are predicted to evaluate at least one of a failure timeline of the equipment, an end of life (EOL) prediction, and a dynamic threshold limit of the equipment, wherein the failure timeline pertains to an anticipated timeline pertaining to the deterioration in the condition of the equipment, wherein the EOL prediction pertains to an anticipated timeline pertaining to an absolute non-functioning condition of the equipment, and wherein the dynamic threshold limit is related to a relative change in a predefined threshold pertaining to the at least one variable.

6. The system as claimed in claim 1, wherein each of the plurality of data capturers is at least one of a visual data capturer and an Internet of Things (IoT) device, wherein the visual data capturer comprises at least one of a camera and a closed-circuit television (CCTV), and wherein the IoT device comprises at least one sensor to detect sensor data.

7. The system as claimed in claim 1, wherein the raw input data comprises at least one of structured data and unstructured data, and wherein the at least one variable comprises at least one of a temperature related to the equipment, a mechanical vibration related to the equipment, an atmospheric humidity in the vicinity of the equipment, rotation per minute (RPM) of a tool related to the equipment, electrical parameters, equipment parameters, mechanical parameters, a running time of the equipment, age of the equipment, machine overloading of the equipment, age of the tool related to the equipment, friction data, health of the equipment, and maintenance information of the equipment.

8. The system as claimed in claim 1, wherein each edge computing node processes the respective raw input data to identify selected variables from the at least one variable, and wherein the selected variables are used to generate statistical variables pertaining to at least one of mean, standard deviation, variance, kurtosis, and skew.

9. The system as claimed in claim 8, wherein the first processor performs an analysis pertaining to co-occurrence of the statistical variables to identify at least one endorsed group comprising a combination of the statistical variables that co-occur with each other in a historical data processed by at least one trained model having a prediction accuracy above 80%.

10. The system as claimed in claim 9, wherein the at least one endorsed group is identified by using a genetic algorithm that performs at least one of a cross-over step and a mutation step on the statistical variables.

11. The system as claimed in claim 9, wherein the at least one endorsed group is assessed to evaluate for consistency of occurrence of the statistical variables across the endorsed groups to obtain variable clusters, and wherein the variable clusters are assessed to obtain discrete perspectives corresponding to the insight pertaining to the deviation.

12. The system as claimed in claim 11, wherein each variable cluster is processed to identify a key parameter related to the variable that is influential in deteriorating the condition of the equipment, wherein the key parameter is identified by deriving a decision tree for each variable cluster by relating the variables of the variable cluster to a probability of an outcome, wherein the outcome pertains to at least one of corrective maintenance, no maintenance, and preventive maintenance, and wherein Weibull parameter estimation is performed, based on the key parameter, to generate a life cycle graph of the key parameter with respect to time.

13. The system as claimed in claim 12, wherein a dual step method is performed, based on the life cycle graph of the key parameter, wherein the dual step method comprises generating a local optima and a global optima, wherein the local optima is obtained by selecting data-driven near optimal start values using at least one of particle swarm optimization, Ant colony optimization, and Artificial bee colony optimization ensemble approach, wherein the values pertaining to the local optima are tuned using deterministic Lavenberg—Marquardt Newton parameter estimation technique to obtain the global optima value, and wherein the life cycle graph of the key parameter is used for estimating mean time to failure (MTTF).

14. The system as claimed in claim 11, wherein discrete perspectives are processed to interrelate the variables across each variable cluster with historical corrective actions to obtain a clique, and wherein the clique represents an association between a state of the variable of the equipment and the respective remedial action.

15. The system as claimed in claim 14, wherein the association is mined by at least one of ensemble approach, ensembled clustering, and base classifier prediction.

16. The system as claimed in claim 1, wherein the equipment is coupled to an actuator for performing the automated actuation for the regulation of the deviation, the automated actuation being performed by sending a feedback to the actuator to recommend the remedial action, and wherein the actuator performs the automated actuation based on the feedback received from the respective edge computing node at the location.

17. The system as claimed in claim 16, wherein the actuator is at least one of a mechanical actuator, an electromechanical actuator, a pneumatic actuator, a magnetic actuator, a relay based actuator, an electromagnetic actuator, a hydraulic actuator, a piezoelectric actuator, and a thermal actuator.

18. A method for predictive maintenance of an equipment, the method comprising:
receiving, by a first processor of an edge computing node of a plurality of edge computing nodes, a raw input data from a respective data capturer of a plurality of data capturers, wherein the raw input data pertains to at least one variable corresponding to a condition of an equipment;
processing, by the first processor, the raw input data to obtain a representative data, wherein the representative data corresponds to a representative set of nodes selected from the plurality of edge computing nodes, and comprises: an insight pertaining to a deviation in the at least one variable, and
a corresponding remedial action to be taken to correct the deviation,
wherein the deviation is related to a deterioration in the condition of the equipment;
recommending, by the first processor, the remedial action in the form of a feedback; and
performing, by an actuator coupled with the equipment, an automated actuation based on the feedback,
wherein the plurality of edge computing nodes are segmented into multiple groups, and wherein the representative set of nodes are selected from each of the multiple groups.

19. The method as claimed in claim 18, the method comprising:
receiving, by a second processor of a cloud computing device communicably coupled to the plurality of edge computing nodes, a selective dataset from the representative set of nodes, wherein the selective dataset comprises the representative data from the representative set of nodes selected from the plurality of edge computing nodes; and
training, by the second processor, based on the selective dataset, an artificial intelligence (AI) model of the second processor, through a collaborative learning for automated prediction of failure state patterns pertaining to the condition of the equipment, wherein the AI model is trained by adaptive federated learning based on segmentation.

20. A non-transitory computer readable medium comprising machine executable instructions that are executable by a processor to:
receive a raw input data from a respective data capturer of a plurality of data capturers, wherein the raw input data pertains to at least one variable corresponding to a condition of an equipment;
process the raw input data to obtain a representative data, wherein the representative data comprises an insight pertaining to a deviation in the at least one variable and a corresponding remedial action to be taken to correct the deviation, wherein the deviation is related to a deterioration in the condition of the equipment;
perform an automated actuation based on the corresponding remedial action;
receive a selective dataset from a representative set of nodes, wherein the selective dataset comprises the representative data from the representative set of nodes selected from a plurality of edge computing nodes, wherein the plurality of edge computing nodes are segmented into multiple groups such that the representative set of nodes are selected from each of the multiple groups; and
train, based on the selective dataset, an artificial intelligence (AI) model, through a collaborative learning for automated prediction of failure state patterns pertaining to the condition of the equipment.

* * * * *